US012603891B2

(12) United States Patent
Beauchesne et al.

(10) Patent No.: US 12,603,891 B2
(45) Date of Patent: Apr. 14, 2026

(54) METHOD, PRODUCT, AND SYSTEM FOR GENERATING A SOFTWARE REPRESENTATION THAT EMBODIES NETWORK CONFIGURATION AND POLICY DATA OF A COMPUTER NETWORK FOR USE IN SECURITY MANAGEMENT

(71) Applicant: Vectra AI, Inc., San Jose, CA (US)

(72) Inventors: Nicolas Beauchesne, Honolulu, HI (US); Sohrob Kazerounian, Brookline, MA (US); William Stow Finlayson, IV, Cherry Hill, NJ (US); Karl Matthew Lynn, San Jose, CA (US)

(73) Assignee: Vectra AI, Inc., San Jose, CA (US)

( * ) Notice: Subject to any disclaimer, the term of this patent is extended or adjusted under 35 U.S.C. 154(b) by 118 days.

(21) Appl. No.: 17/711,850

(22) Filed: Apr. 1, 2022

(65) Prior Publication Data

US 2023/0319050 A1 Oct. 5, 2023

(51) Int. Cl.
*H04L 9/40* (2022.01)

(52) U.S. Cl.
CPC ............ *H04L 63/104* (2013.01); *H04L 63/20* (2013.01)

(58) Field of Classification Search
CPC .............................. H04L 63/104; H04L 63/20
See application file for complete search history.

(56) References Cited

U.S. PATENT DOCUMENTS 6,321,338 B1   11/2001   Porras et al.
6,651,099 B1   11/2003   Dietz et al.

7,305,383 B1 *   12/2007   Kubesh ................ G05B 19/045
8,272,061 B1 *    9/2012   Lotem ................. H04L 63/1416
                                                                709/224
9,432,394 B1      8/2016   Lahiri et al.
(Continued)

FOREIGN PATENT DOCUMENTS

CA        2926579        10/2016
CN        105262771       1/2016
(Continued)

OTHER PUBLICATIONS

D. Kreutz, F. M. V. Ramos, P. E. Veríssimo, C. E. Rothenberg, S. Azodolmolky and S. Uhlig, "Software-Defined Networking: A Comprehensive Survey," in Proceedings of the IEEE, vol. 103, No. 1, pp. 14-76 (Jan. 2015) (Year: 2015).*
(Continued)

*Primary Examiner* — Theodore C Parsons
(74) *Attorney, Agent, or Firm* — Vista IP Law Group, LLP

(57) ABSTRACT

Disclosed is an approach for generating a software representation that embodies network configuration and policy data of a computer network for use in security management. The software representation comprises a state machine where different states can be reached using respective transitions or properties which are possible as determined based on the network configuration and network policy data. The states correspond to respective entities on the network which may comprise resources that are identifiable for protection. The software representation can then be stimulated with various inputs to identify sequences of state-to-state transitions which may in turn be processed to generate corresponding detection signatures for use in monitoring the network.

24 Claims, 16 Drawing Sheets

(56) References Cited

U.S. PATENT DOCUMENTS

| | | | |
|---|---|---|---|
| 10,148,685 | B2 | 12/2018 | Hassanzadeh et al. |
| 10,528,868 | B2 | 1/2020 | Gillespie et al. |
| 11,922,712 | B2 | 3/2024 | Tsibulevskiy et al. |
| 2003/0051026 | A1 | 3/2003 | Carter et al. |
| 2003/0188189 | A1 | 10/2003 | Desai et al. |
| 2008/0044018 | A1 | 2/2008 | Scrimsher et al. |
| 2013/0097125 | A1 | 4/2013 | Marvasti et al. |
| 2013/0283360 | A1 | 10/2013 | Hui et al. |
| 2013/0340083 | A1 | 12/2013 | Petrica et al. |
| 2014/0279808 | A1* | 9/2014 | Strassner .............. G06Q 10/06 706/47 |
| 2015/0033340 | A1 | 1/2015 | Giokas |
| 2016/0301704 | A1 | 10/2016 | Hassanzadeh et al. |
| 2017/0161498 | A1 | 6/2017 | Yavo |
| 2018/0232523 | A1 | 8/2018 | Copty et al. |
| 2019/0109872 | A1 | 4/2019 | Dhakshinamoorthy et al. |
| 2019/0182287 | A1 | 6/2019 | Hanley et al. |
| 2019/0228098 | A1 | 7/2019 | Daly et al. |
| 2019/0266071 | A1 | 8/2019 | Copty et al. |
| 2020/0022003 | A1* | 1/2020 | Bizzarri ............... H04W 24/02 |
| 2020/0028861 | A1 | 1/2020 | Pritzkau et al. |
| 2020/0073783 | A1 | 3/2020 | Hortala et al. |
| 2020/0177618 | A1 | 6/2020 | Hassanzadeh et al. |
| 2020/0193031 | A1 | 6/2020 | Avraham et al. |
| 2020/0304534 | A1 | 9/2020 | Rakesh et al. |
| 2021/0194924 | A1 | 6/2021 | Heinemeyer et al. |
| 2021/0243208 | A1 | 8/2021 | Rubin et al. |
| 2021/0243226 | A1 | 8/2021 | El Gamal et al. |
| 2021/0248443 | A1 | 8/2021 | Shu et al. |
| 2021/0336971 | A1 | 10/2021 | Robbins et al. |
| 2021/0352100 | A1 | 11/2021 | Barai et al. |
| 2022/0014561 | A1 | 1/2022 | Caceres et al. |
| 2022/0159033 | A1 | 5/2022 | Mizrahi et al. |
| 2022/0269591 | A1 | 8/2022 | Mcshane et al. |
| 2022/0319219 | A1 | 10/2022 | Tsibulevskiy et al. |
| 2022/0368702 | A1 | 11/2022 | Robbins et al. |
| 2023/0050691 | A1 | 2/2023 | Gu et al. |
| 2023/0262073 | A1 | 8/2023 | Sheu et al. |
| 2023/0336581 | A1 | 10/2023 | Dunn et al. |

FOREIGN PATENT DOCUMENTS

| | | |
|---|---|---|
| CN | 107277039 | 10/2017 |
| CN | 109597767 | 4/2019 |
| CN | 109815009 | 5/2019 |
| CN | 111049827 | 4/2020 |
| EP | 3726803 | 10/2020 |
| EP | 4254865 A1 | 10/2023 |
| EP | 4254866 A1 | 10/2023 |
| EP | 4254867 A2 | 10/2023 |
| EP | 4254869 A2 | 10/2023 |
| EP | 4254868 A3 | 11/2023 |
| WO | WO 2015/013376 A2 | 1/2015 |
| WO | 2020046981 | 3/2020 |
| WO | 2022043512 | 3/2022 |

OTHER PUBLICATIONS

Non-Final Office Action for U.S. Appl. No. 17/711,884 dated Feb. 2, 2024.
Non-Final Office Action for U.S. Appl. No. 17/711,903 dated Jan. 8, 2024.
Non-Final Office Action for U.S. Appl. No. 17/711,811 dated Feb. 15, 2024.
Notice of Allowance for U.S. Appl. No. 17/711,868 dated Mar. 18, 2024.
Extended European Search Report for EP Patent Appln. No. 22191319.7 dated Aug. 17, 2023.
Extended European Search Report for EP Patent Appln. No. 22191317.1 dated Aug. 3, 2023.
Extended European Search Report for EP Patent Appln. No. 22191320.5 dated Sep. 28, 2023.
Extended European Search Report for EP Patent Appln. No. 22191322.1 dated Oct. 2, 2023.
Extended European Search Report for EP Patent Appln. No. 22191321.3 dated Oct. 2, 2023.
Final Office Action for U.S. Appl. No. 17/711,884 dated May 23, 2024.
Notice of Allowance for U.S. Appl. No. 17/711,868 dated Aug. 23, 2024.
Final Office Action for U.S. Appl. No. 17/711,903 dated May 7, 2024.
Notice of Allowance for U.S. Appl. No. 17/711,903 dated Sep. 26, 2024.
Final Office Action for U.S. Appl. No. 17/711,811 dated Jul. 11, 2024.
Notice of Allowance for U.S. Appl. No. 17/711,868 dated Mar. 15, 2024.
Extended European Search Report for EP Patent Appln. No. 23199257.9 dated Mar. 6, 2024.
Notice of Allowance for U.S. Appl. No. 17/711,811 dated Feb. 21, 2025.
Moser et al., "Exploring Multiple Execution Paths for Malware Analysis", 2007 IEEE Symposium on Security and Privacy (SP '07), Date of Conference: May 20-23 (Year: 2007).
Non-Final Office Action for U.S. Appl. No. 17/711,811 dated Oct. 28, 2024.
Notice of Allowance for U.S. Appl. No. 17/711,868 dated Oct. 28, 2024.
Notice of Allowance for U.S. Appl. No. 17/711,884 dated Nov. 1, 2024.
Non-Final Office Action for U.S. Appl. No. 18/128,549 dated Mar. 17, 2025.
Notice of Allowance for U.S. Appl. No. 17/711,884 dated Apr. 4, 2025.
Non-Final Office Action for U.S. Appl. No. 18/108,383 dated Apr. 17, 2025.
L. Zhao, P. Cao, Y. Duan, H. Yin and J. Xuan, "Probabilistic Path Prioritization for Hybrid Fuzzing," in IEEE Transactions on Dependable and Secure Computing, vol. 19, No. 3, pp. 1955-1973, May 1-Jun. 2022.
Notice of Allowance for U.S. Appl. No. 17/711,811 dated Apr. 21, 2025.
Jeon et al., "Automated Crash Filtering Using Interprocedural Static Analysis for Binary Codes", 2017 IEEE 41st Annual Computer Software and Applications Conference (COMPSAC), Date of Conference: Jul. 4-8 (Year: 2017).
Examination Report for EP Patent Appln. No. 22191322.1 dated Jul. 11, 2025.
Notice of Allowance for U.S. Appl. No. 17/711,884 dated Aug. 6, 2025.
Final Office Action for U.S. Appl. No. 18/128,549 dated Aug. 11, 2025.
Final Office Action for U.S. Appl. No. 18/108,383 dated Oct. 7, 2025.
Non-Final Office Action for U.S. Appl. No. 18/128,549 dated Dec. 29, 2025.
Notice of Allowance for U.S. Appl. No. 18/108,383 dated Feb. 24, 2026.
Torlak, Emina. "A constraint solver for software engineering: finding models and cores of large relational specifications," Diss. Massachusetts Institute of Technology, 2009.
Steimann, Friedrich, Jörg Hagemann, and Bastian Ulke. "Computing repair alternatives for malformed programs using constraint attribute grammers." Proceedings of the 2016 ACM SIGPLAN International Conference on Object-Oriented Programming, Systems, Languages, and Applications. 2016.
Liang, Hongliang, el al. "Fuzzing: State of the art." IEEE Transactions on Reliability 67.3 (2018).
Simon, Laurent, and Akash Verma. "Improving fuzzing through controlled compilation." 2020 IEEE European Symposium on Security and Privacy (EuroS&P). IEEE, 2020.

(56) References Cited

OTHER PUBLICATIONS

Zhu, Xiaogang, el al. "Fuzzing: a survey for roadmap." ACM
Computing Surveys (CSUR) 54.11s (2022).

\* cited by examiner

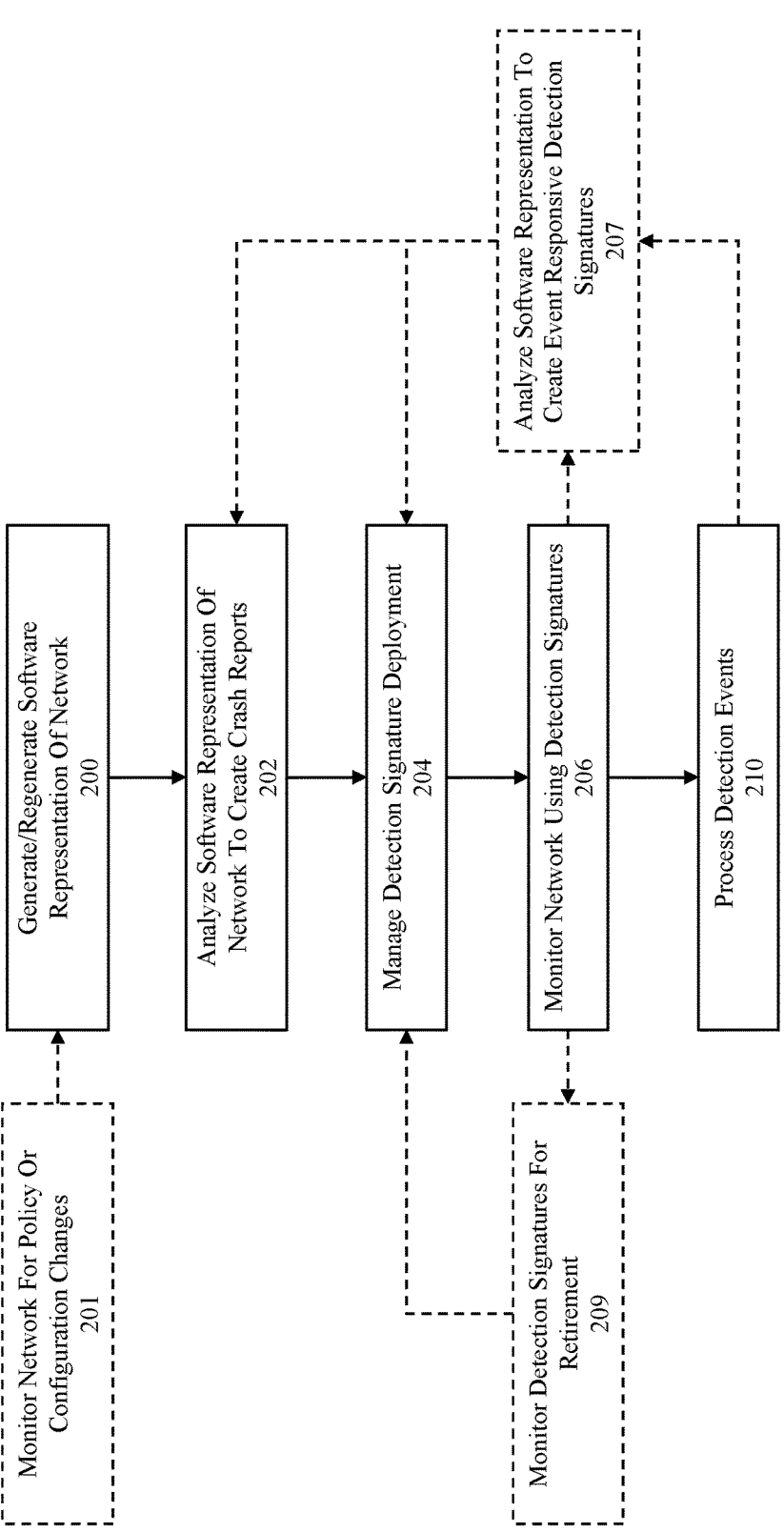

Generate/Regenerate Software Representation Of Network
200

Monitor Network For Policy Or Configuration Changes
201

Analyze Software Representation Of Network To Create Crash Reports
202

Manage Detection Signature Deployment
204

Monitor Detection Signatures For Retirement
209

Monitor Network Using Detection Signatures
206

Analyze Software Representation To Create Event Responsive Detection Signatures
207

Process Detection Events
210

Fig. 2

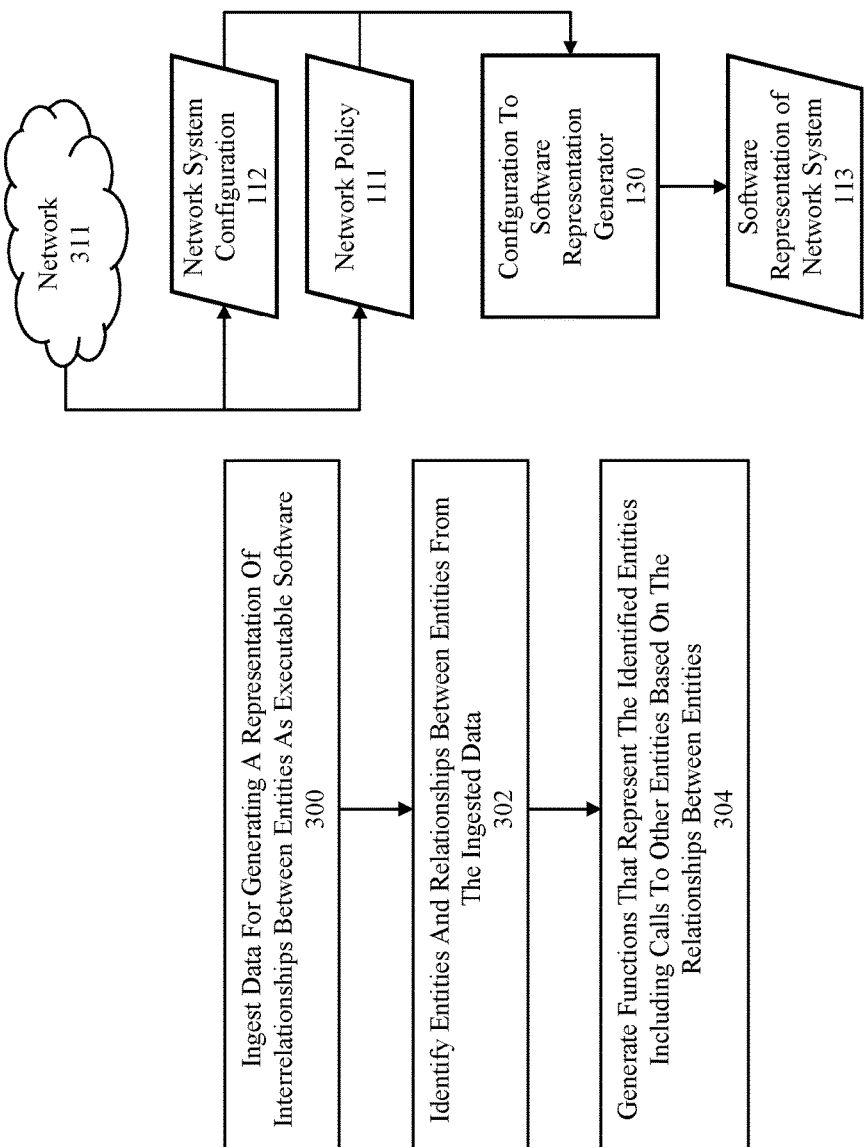

Network
311

Network System
Configuration
112

Network Policy
111

Configuration To
Software
Representation
Generator
130

Software
Representation of
Network System
113

Ingest Data For Generating A Representation Of
Interrelationships Between Entities As Executable Software
300

Identify Entities And Relationships Between Entities From
The Ingested Data
302

Generate Functions That Represent The Identified Entities
Including Calls To Other Entities Based On The
Relationships Between Entities
304

Fig. 3A

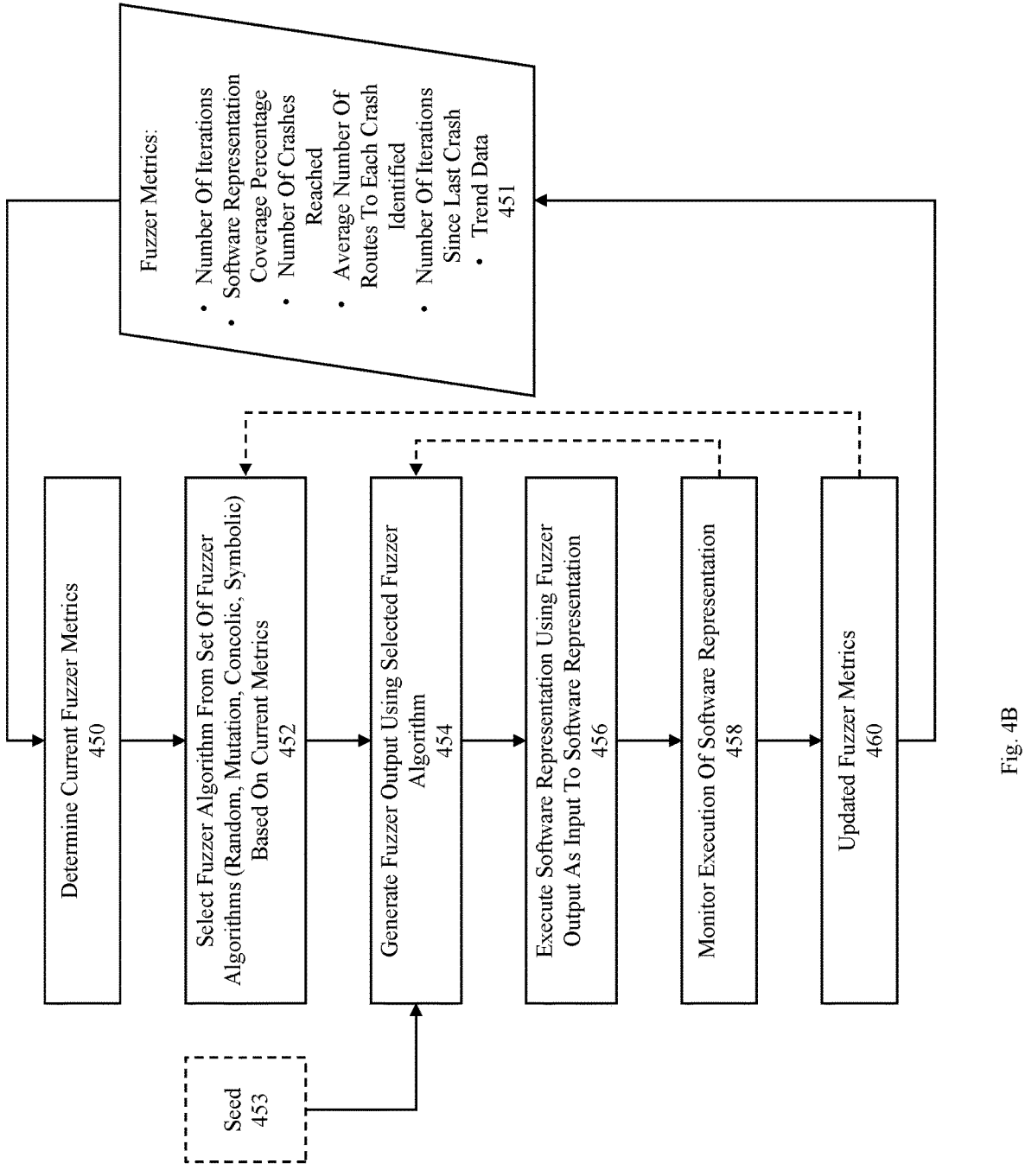

Fuzzer Metrics:

- Number Of Iterations
- Software Representation Coverage Percentage
- Number Of Crashes Reached
- Average Number Of Routes To Each Crash Identified
- Number Of Iterations Since Last Crash
- Trend Data
  451

Determine Current Fuzzer Metrics
450

Select Fuzzer Algorithm From Set Of Fuzzer Algorithms (Random, Mutation, Concolic, Symbolic) Based On Current Metrics
452

Generate Fuzzer Output Using Selected Fuzzer Algorithm
454

Execute Software Representation Using Fuzzer Output As Input To Software Representation
456

Monitor Execution Of Software Representation
458

Updated Fuzzer Metrics
460

Seed
453

Fig. 4B

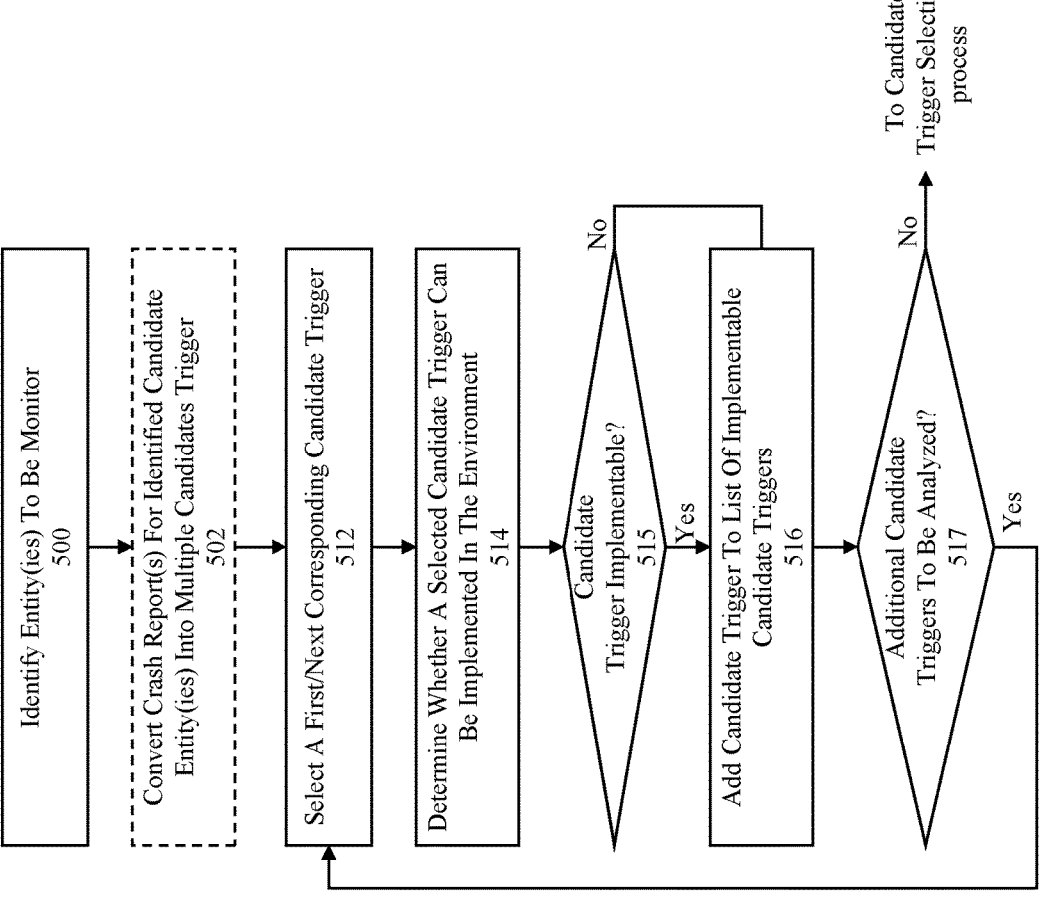

Identify Entity(ies) To Be Monitor
500

Convert Crash Report(s) For Identified Candidate Entity(ies) Into Multiple Candidates Trigger
502

Select A First/Next Corresponding Candidate Trigger
512

Determine Whether A Selected Candidate Trigger Can Be Implemented In The Environment
514

Candidate Trigger Implementable?
515
No
Yes

Add Candidate Trigger To List Of Implementable Candidate Triggers
516

Additional Candidate Triggers To Be Analyzed?
517
No
Yes

To Candidate Trigger Selection process

Fig. 5A

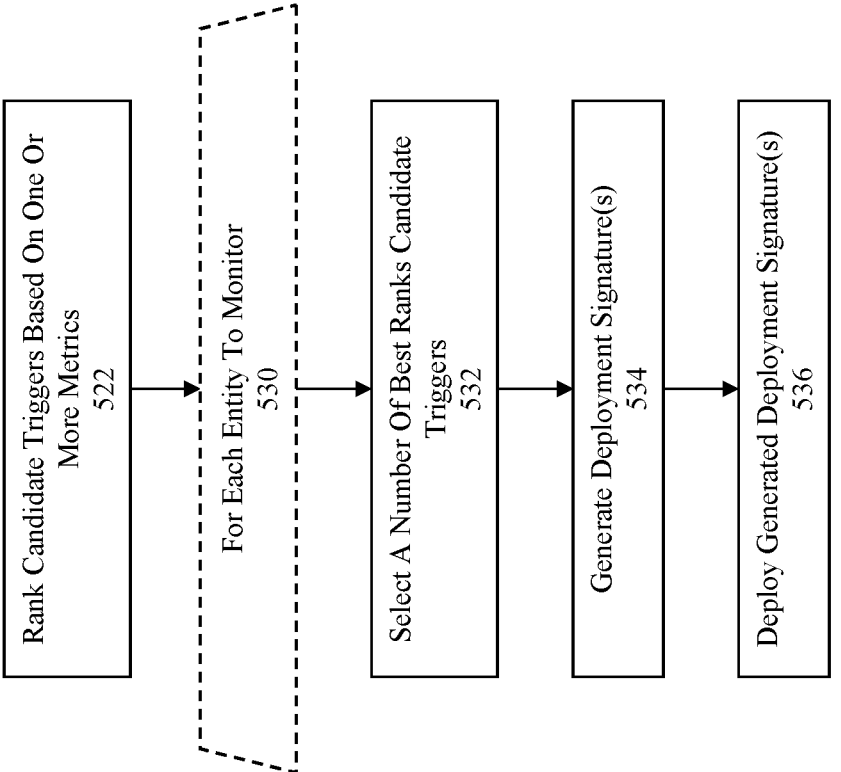
Fig. 5B1

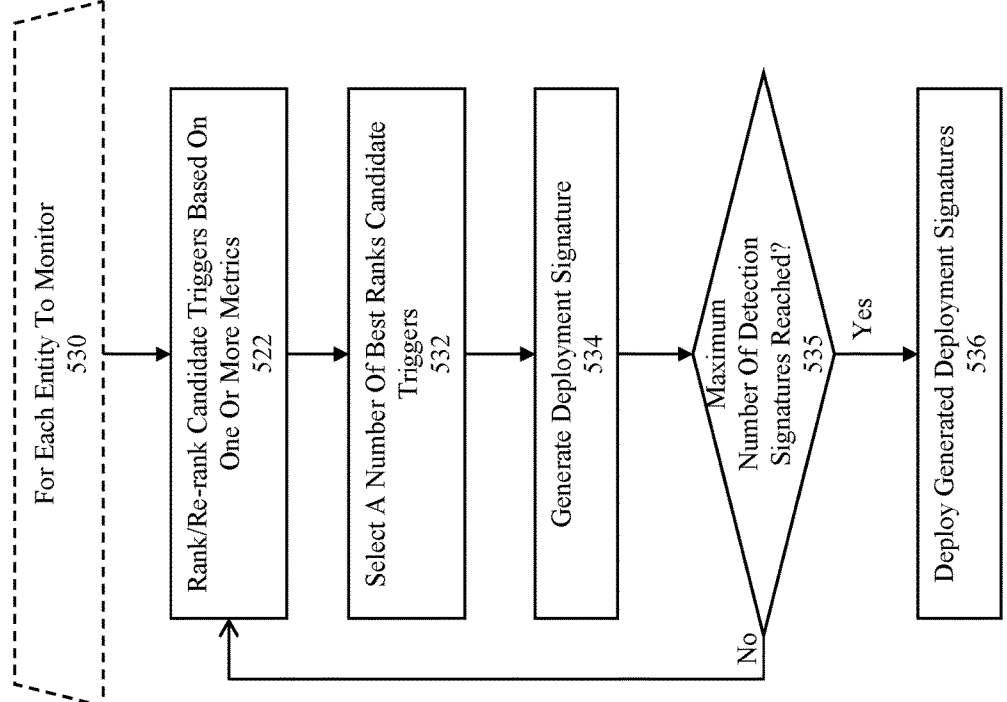
Fig. 5B2

For Each Selected Candidate Trigger
600

Determine One Or More Actions Or Properties Corresponding To The Selected Candidate Trigger
602

Search For Corresponding Detection Signature Template(s)
604

Duplicate And Modify The Corresponding Detection Signature Template(s) To Form Detection Signature(s)
606

Identify Seed Corresponding To A Triggering Event 802

Authorize Additional Detection Signatures For Threat Detection Response 804

Analyze Software Representation Of Network To Generate Crash Reports Using 806

Manage Detection Signature Generation And Deployment Of Detection Signatures Generated In Response To The Threat 808

METHOD, PRODUCT, AND SYSTEM FOR GENERATING A SOFTWARE REPRESENTATION THAT EMBODIES NETWORK CONFIGURATION AND POLICY DATA OF A COMPUTER NETWORK FOR USE IN SECURITY MANAGEMENT

RELATED APPLICATIONS

The present application is related to co-pending U.S. patent application Ser. No. 17/711,811 titled "METHOD, PRODUCT, AND SYSTEM FOR NETWORK SECURITY MANAGEMENT USING SOFTWARE REPRESENTATION THAT EMBODIES NETWORK CONFIGURATION AND POLICY DATA", U.S. patent application Ser. No. 17/711,868 titled "METHOD, PRODUCT, AND SYSTEM FOR ANALYZING A COMPUTER NETWORK TO IDENTIFY ATTACK PATHS USING A SOFTWARE REPRESENTATION THAT EMBODIES NETWORK CONFIGURATION AND POLICY DATA FOR SECURITY MANAGEMENT", U.S. patent application Ser. No. 17/711,884 titled "METHOD, PRODUCT, AND SYSTEM FOR ANALYZING ATTACK PATHS IN COMPUTER NETWORK GENERATED USING A SOFTWARE REPRESENTATION THAT EMBODIES NETWORK CONFIGURATION AND POLICY DATA FOR SECURITY MANAGEMENT", U.S. patent application Ser. No. 17/711,903 titled "METHOD, PRODUCT, AND SYSTEM FOR GENERATING DETECTION SIGNATURES BASED ON ATTACK PATHS IN A COMPUTER NETWORK IDEN-TIFIED USING A SOFTWARE REPRESENTATION THAT EMBODIES NETWORK CONFIGURATION AND POLICY DATA FOR SECURITY MANAGEMENT USING DETECTION SIGNATURE TEMPLATES" filed on even date herewith, which are hereby incorporated by reference in their entirety.

BACKGROUND

The vast majority of systems that exist today for moni-toring network environments and generating alerts in response to instances of perceived cybersecurity attacks tend to operate by means of activity monitoring and subsequent pattern matching to identify anomalies and malicious sig-natures. These detection and response system have also benefited from recent advances in machine learning (e.g., deep learning) which yielded impressive results across domains as widely varying as speech and language, com-puter vision, and control. Machine learning models have also enabled advancements in many fields including network security. However, existing approaches to maintain network security using machine learning fail to account for the wealth of information represented by network configura-tions and network policies.

In contrast, machine learning used for maintaining net-work security attempts to model what is normal solely based on observing traffic on a network. Similarly, engineers try to represent what is normal by specifying what is abnormal (e.g., by creating signatures that capture or represent previ-ously observed abnormal behavior).

However, the network configuration and network policy data can expressly describe what can be done within a network—e.g., by describing relationships between entities. This presents a wealth of information that might be lever-aged to maintain network security. Unfortunately, current approaches fail to utilize the information provided the network configuration and network policy data.

Therefore, what is needed is an improved approach for detecting malicious network activity that accounts for the network configuration and policy data.

SUMMARY

The method, product, and system for generating a soft-ware representation that embodies network configuration and policy data of a computer network for use in security management.

In some embodiments, the approach includes a process to generate a software representation of what is possible in a computer network based on network configuration data and network policy data. The software representation comprises a state machine where different states can be reached using respective transitions or properties which are possible as determined based on the network configuration and network policy data. The states correspond to respective entities on the network which may comprise resources that are identi-fiable for protection. The software representation can then be stimulated with various inputs to identify sequences of state-to-state transitions which may in turn be processed to generate corresponding detection signatures for use in moni-toring the network.

Further details of aspects, objects, and advantages of some embodiments are described below in the detailed description, drawings, and claims. Both the foregoing gen-eral description and the following detailed description are exemplary and explanatory and are not intended to be limiting as to the scope of the embodiments.

BRIEF DESCRIPTION OF THE DRAWINGS

The drawings illustrate the design and utility of some embodiments of the present invention. It should be noted that the figures are not drawn to scale and that elements of similar structures or functions are represented by like ref-erence numerals throughout the figures. A more detailed description of the present inventions briefly described above will be rendered by reference to specific embodiments thereof, which are illustrated in the accompanying drawings. These drawings depict only typical embodiments of the invention and are not therefore to be considered limiting of its scope, the invention will be described and explained with additional specificity and detail using the accompanying drawings.

FIG. 2 illustrates a process flow according to some embodiments of the invention.

FIGS. 3A-3B illustrate an expanded view for generating a software representation of a network according to some embodiments of the invention.

FIGS. 4A-4B illustrate an expanded view for analyzing the software representation of the network to create crash reports according to some embodiments of the invention.

FIGS. 5A-5B2 illustrate an expanded view for managing detection signature deployment according to some embodi-ments of the invention.

DETAILED DESCRIPTION

Figure 1A:
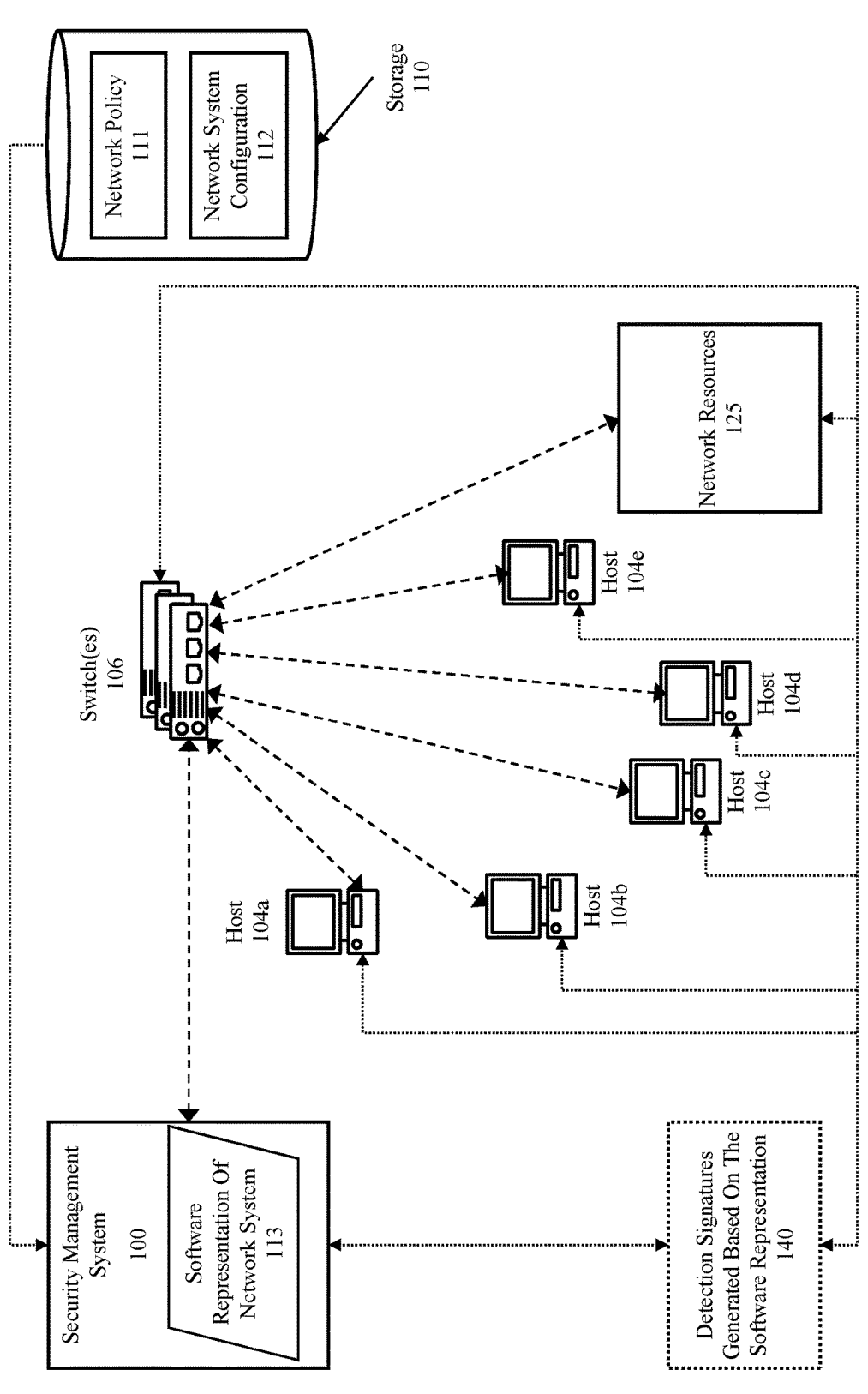
FIGS. 1A-1C illustrate an example arrangement of an architecture for network security management using a soft-ware representation that embodies network configuration and policy data according to some embodiments of the invention.

Various embodiments of the invention are directed to a method, product, and system for generating a software representation that embodies network configuration and policy data of a computer network for use in security management.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items.

Generally, a malicious actor might attempt to gain access to a network to obtain data that the network operator(s) do not intend to be provided to the malicious actor. For instance, a malicious actor may attempt to gain access to the internal network through a firewall. Normally, malicious actors use any of several methods to gain access to a network. For example, a malicious actor can gain access by social methods (e.g. tricking, bribing, phishing, infiltrating, dumpster diving, physically stealing, etc.), brute force methods to identify (generally weak) passwords, physical access to a machine (e.g. a machine left unattended in a public area), or other technical methods that focus on leveraging vulnerabilities at the software or hardware level (e.g. backdoors, buffer overflow attacks, email worm, root kits, session hijacking, and trojan horse programs). Regardless of the method used, the initial goal is to gain a foothold within the network that can be accessed by the malicious actor to the network.

As used herein, the network may comprise any combination of computing devices within one or more network environments including network communication apparatus and any computing devices logically or physically connected thereto. At least some aspects of the network are described by one or more of network configuration or policy data which describes conditions for interactions (e.g., access rights) between, and in some instances within, or otherwise associated with computing devices. For example, the computing devices may be arranged in any combination of local computing devices (e.g., within a local domain, computing cluster, or cloud), remote computing devices (e.g., within a separate/remote domain, computing cluster, cloud, or otherwise located at a different physical location), and may include personal computing devices which are associated with one or more access rights as described in one or more network configuration data sets or network policy data sets. However, for ease of understand, the description provided herein refers to any of these arrangements as network configuration and policy data. For example, a local network and a cloud network may be interconnected to provide access to computing resources for employees and contractors to perform relevant duties where any of the local network, the cloud network, and devices used by employees and contractors may be located in any number of network domains and may be associated with any number of network configuration and policy data sets.

A malicious actor may operate externally to a network (e.g., through a firewall), or may have direct access to an internal network and thus avoids the challenge of overcoming the protections of a firewall. For instance, a malicious actor might be an employee undertaking a course of action adverse to their employer (operator/owner of the network)—e.g., corporate espionage, trade secret theft, accessing restricted materials, etc. In some embodiments, the malicious actor has no actual malice and is instead merely an individual engaging in abnormal, risky, reckless, or otherwise undesirable activity that may pose a risk to network resources (a network resource as used herein corresponds to an entity having one or more relationships as defined in the network configuration and network policy data). For example, an administrator using a publicly accessible kiosk to stage documents for transfer to a nearby device.

Whether an external or an internal actor, the malicious actor might also gain access to other hosts to use those hosts to relay data from other network resources to which they do not have direct access such as by stealing credentials from various hosts that may have authorization to access sensitive resources (identified entities as discussed further below). Detecting this activity early can allow for protection of sensitive resources before they are actually breached.

By ingesting and analyzing the configuration information of an environment (e.g., network configuration and policy data), the approach can focus only (or primarily) on those portions of the network environment that are most likely to result in catastrophic failure or compromise. Such a procedure can work at multiple scales (e.g., binary instrumentation logs, system event logs, network configuration, cloud configuration, etc.), but does so in the most general sense by ingesting network configuration data (the network configuration and network policy data), distilling causal relationships, where the collected information can be projected into a composite transition space. The network configuration data contains objects or entity identifiers—e.g., identification of the entities on the network such as accounts, servers, hosts, group identifiers. The network policy data specifies which objects or entities are members of which groups and the rights allocated to each group. In some embodiments, the network configuration data and network policy data are provided together in a dataset specifying the entities and access rights within a network. In some embodiments, the network configuration data and the network policy data may each include any or all aspects of the other. In some embodiments, the network configuration data or the network policy data specifies access rights allocated to individual entities. The causal relationships can be distilled from the definitions given for the environment as represented by the configuration information. In some embodiments, the configuration information comprises a projection into the composite transition space from multiple sources (e.g., Active Directory and Windows Host Eventing) and allows the system to contextualize credential theft and reuse and to track documents originating outside the organization.

Generally, the composite transition space allows the determination of one or more states or transitions between states which could lead to a critical state—e.g., one corresponding to a potential compromise of protected resource. For example, a protected resource (entity) might comprise a human resources database which is represented as an entity in the network configuration and network policy data and which is identified for protection. The interaction with this protected resource might be recognized as a high value state, where reaching that state or reaching that state with some number of conditions being met should be reported as abnormal or potentially malicious. For example, an unknown host device or a host device not associated with an account that is allowed to access the resource (as determined based on the network configuration and/or the network policy data) might be identified as a critical state within the transition state. As will be discussed further below, these states or transitions between states, in any relevant combination, can be identified as candidate triggers for detection signatures that identify a corresponding activity in a computing environment. In some embodiments, the set of candidate triggers are processed to identify the most commonly occurring subset. In some embodiments, the detection signatures are generated using signature templates and generate detection events when the corresponding conditions are met. Thus, threat actor activity in the system can be detected using the detection signatures by monitoring for matching conditions or actions. In some embodiments, detection signatures are used to detect sequences of actions where the likelihood that a particular behavior is malicious increases with the number of actions taken to reach a particular resource.

In some embodiments, the approach comprises identifying network configuration data and network policy data for a computer network, generating a software representation of the computer network based on the network configuration data and network policy data by: receiving the network configuration data and the network policy data, identifying a plurality of relationships between objects or entities represented in the network configuration data or the network policy data, and generating a plurality of functions based on the plurality of relationships, wherein at least some of the plurality of functions include one or more function calls selectable based on an input.

In some embodiments, the network configuration data specifies access rights allocated to respective groups and the network policy data specifies comprises a set of access rights for group members to access network resources. In some embodiments, the software representation comprises a source code representation or an executable compiled from the source code representation and represents a plurality of states and transitions between states. In some embodiments, the software representation comprises a source code representation or an executable compiled from the source code representation and encapsulates a bitmap representing a plurality of states and transitions between states.

In some embodiments, the objects comprise one or more entities and the entities comprise any of the following: computing devices, users, domains, group policy objects (GPOs), key vaults, subscriptions, tenants, resource groups, applications, virtual machines (VMs), groups, or organizational units (OUs).

In some embodiments, the plurality of relationships comprise access rights or properties that a respective entity can use to interact with another entity or the plurality of relationships are represented by respective state-transition-state tuples. In some embodiments, a state-transition-state tuple represents a relationship of the plurality relationships and corresponds to a condition, and a function of the plurality of functions includes the condition as a prerequisite to executing a corresponding function call.

Figure 1B:
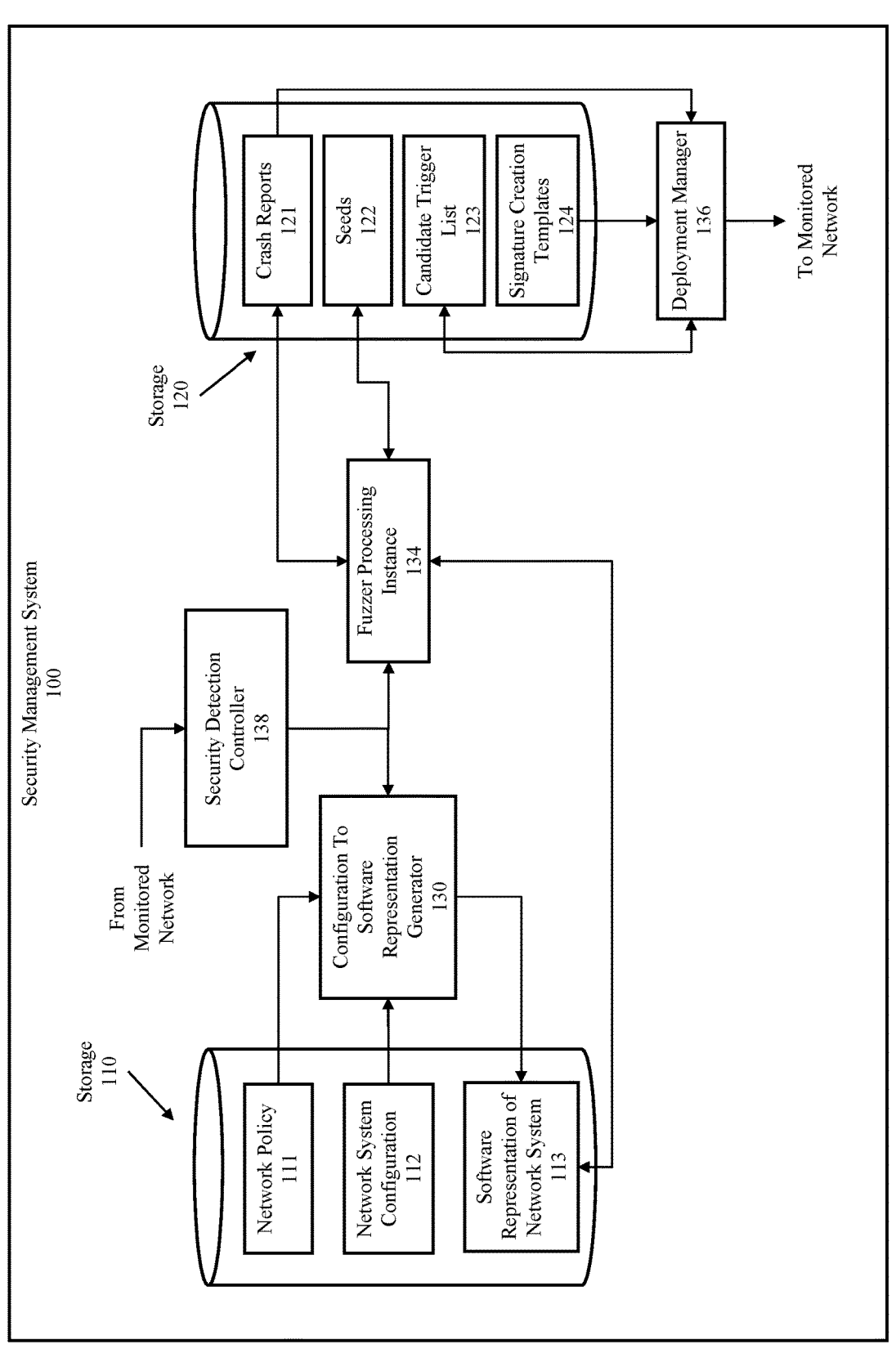
Figure 1C:
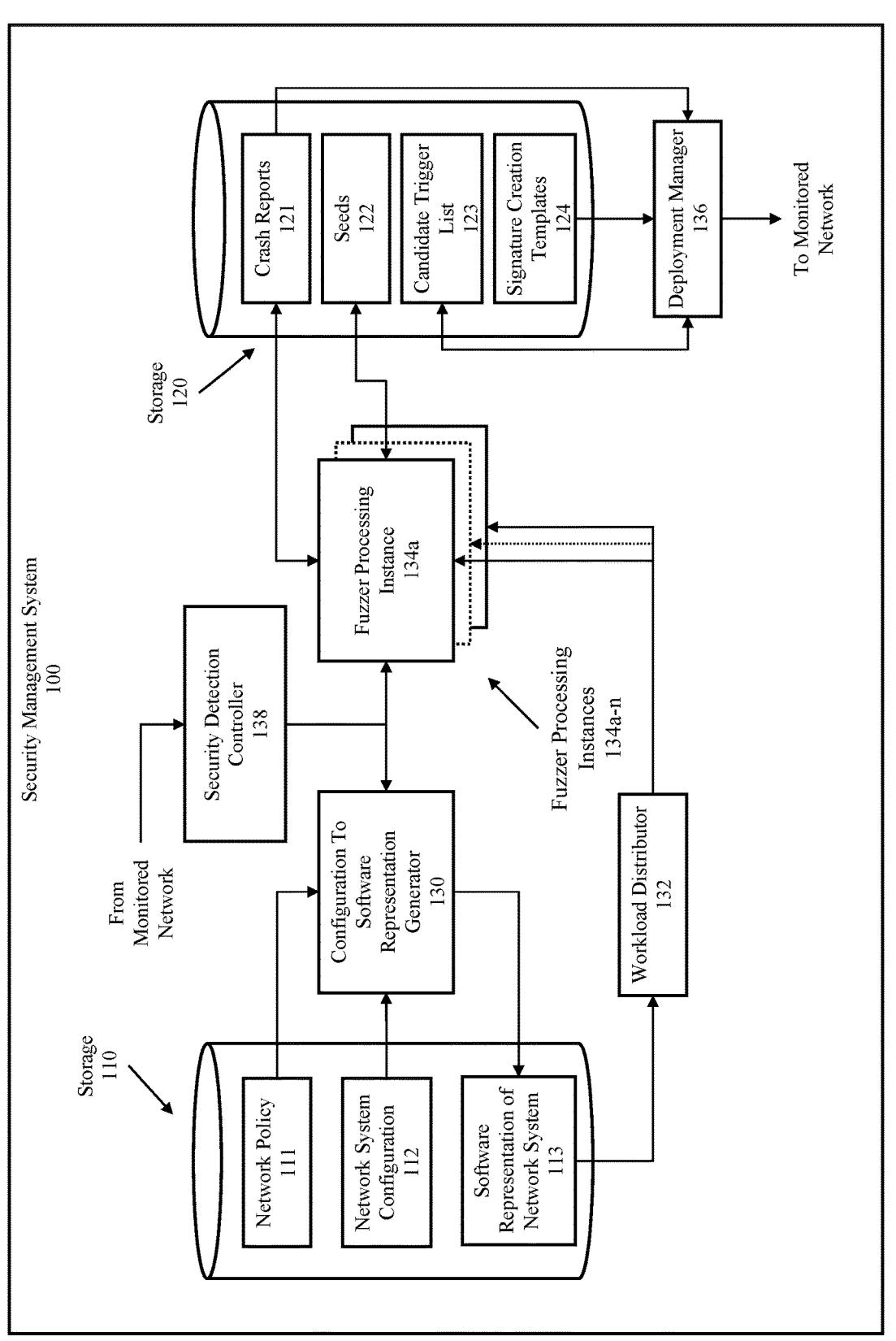

FIGS. 1A-1C illustrates an example arrangement of an architecture for network security management using a software representation that embodies network configuration and policy data according to some embodiments of the invention.

FIG. 1A illustrates an example arrangement of an architecture for network security management using the software representation that embodies network configuration and policy data according to some embodiments of the invention. In particular, FIG. 1A focuses on the overall relationship between elements of the network and the associated security management system.

Malicious external or internal actors generally gain a foothold within a network by stealing credentials from various hosts already authorized to access that network. For example, a network might include many different user accounts used from one or more hosts (see e.g., hosts 104*a-e*) that are interconnected using one or more switches (see switches 106) and connected directly or indirectly to one or more network resources (see e.g., 125). Such accounts are commonly managed using a network policy (see 111) and a network system configuration (see 112). At a high level, the network policy represents the rights of groups to interact with, or access, various network resources to perform various actions such as creating, reading, updating, and deleting. For example, a human resources group might be allowed to access a server that includes information that is not otherwise accessible outside of the HR department. Each group might also be granted access to one or more other resources, (e.g., a printer/scanner in the HR department, an HR email address, etc.). In this way each group can be associated with a set of actions that members of the group are allowed to perform on different resources. Additionally, a network system configuration 112 might comprise a collection of characteristics regarding various entities. Example entities can include computing devices, users, domains, group policy objects (GPOs), key vaults, subscriptions, tenants, resource groups, applications, virtual machines (VMs), groups, or organizational units (OUs), which may be represented in a network system configuration 112. In some embodiments, the network system configuration information specifies rights of and between respective groups and a network policy specifies which entities are members of each group.

In some embodiments, the network itself is an arrangement of electronically connected devices (either wired, wireless, or some combination thereof). For example, one or more switches 106 and/or wireless receiver/transmitter devices are provided to connect the hosts (e.g., hosts 104*a-e*) and the network resources (e.g., 125), a security management system 100, and storage 110. In some embodiments, the security management system 100 is external to the network and may provide security management services to multiple networks.

In some embodiments, the security management system can ingest the network policy 111 and the network configuration 112 in order to form detection signatures 140 using an approach that translates the network policy 111 and network system configuration 112 into a software representation (source code representation or executable compiled from the source code representation). Generation of the software representation will be discussed further below. Briefly the software representation comprises a collection of functions that represent different states of the network where actions taken or leveraged properties are reflected in the calling of a respective function for the corresponding state or property. This software representation can be used to actively determine possible, likely, or critical attack paths—e.g., by stimulating the software representation using a fuzzer to explore paths (a sequence of transitions between states) to reach states of interest (states frequently encountered) or high value states corresponding to identified entities. States of interest or high value states can be associated with one or more crash statements that may be executed subject to one or more conditions. In this way, not only can simply reaching a state be identified, but also or alternatively reaching a state using a path (sequence of state-to-state transitions) that may be indicative of abnormal or malicious behavior (e.g., privilege execution attacks). Additionally, global parameters may also be used to condition the execution of a crash statement (e.g., an external entity accessing a resource internal to the network when a global parameter indicates that a firewall is down). In contrast, current cyber-security products that make use of environment configuration information are generally limited to simple lookup tables and graphs. However, lookups and graph structures ultimately fail to capture the full logic of computing environment configurations such as when a potentially malicious activity is only possible when a global parameter has a particular value. For example, a network configuration of an active directory might be represented as a graph, with users, groups, and machines as vertices, and relationships between them as edges. However, conditions related to those edges or vertices are not readily representable in a graph structure— e.g., a graph cannot represent both an edge that is dependent on a precondition being met and at the same time an edge that is dependent on the precondition not being met, such as when an edge corresponding to membership in a group exists only after a deactivated user account has been re-activated. In contrast, representation of the network configuration as a computer program allows for the encapsulation of the data (e.g., usernames, groups, event names, etc.), as well as the logic and rules that define the space of actions in the environment. In essence, this converts the environment in an abstract sense into a state machine, with the ability to operate on arbitrary configurations, and where the state of the environment can be updated in response to the time-varying inputs or data in that environment. Furthermore, because the configuration of the network is represented in software, tools and techniques that are applied to software can be applied to test, verify, and search the configuration space of the network. Furthermore, in some embodiments, changes can be made to how the configuration is translated into a program in order to yield more optimal or different representations. Further details regarding the security management system will be discuss herein.

As discussed herein, a state may correspond to either a single entity or multiple entities (which may or may not be traditional computing resources such as data stores or rights management systems) that can potentially be compromised in an environment. That is, a state may correspond to any entity, whether logical, physical, or ephemeral, which represents something that can be used as a waypoint by an attacker in service of reaching a target in the environment, where the target may also be an entity. For example, a state may correspond to either a single entity or multiple entities that can potentially be compromised in an environment. The different states can be reached by transitioning from one state to another (e.g., by an attacker using one or more actions or properties to pivot from one state to another). Generally, sensitive states can be identified as high value states, which correspond to entities that if access or controlled by a malicious actor may reflect an elevated threat to another entity within an organization or correspond to a particular entity that has been identified for protection from attackers. These actions may be representable as a collection of one or more state-to-state transitions for which a corresponding detection signature can be generated that converts a candidate trigger (one or more transitions from one state to another and potentially one or more global parameters) into a detection signature using a signature template. In some embodiments, a detection signature comprises one or more atomic rules that can be deployed onto one or multiple detection engines which process incoming streams of events and allows for the detection engine to emit a detection signature when a matching event or sequence of events are found. In some embodiments, the detection signatures are generated using one or more signature templates that provides a framework for converting a corresponding transition from one state to another into a signature that detects those transitions.

In some embodiments, the network includes various mechanisms for capturing information regarding communications over the network including unique host identifiers, sources of communications, destinations for communications, the amount of data sent, the amount of data received, and the port(s) used for communication. The capture of this information might be accomplished using multiple distributed sensing modules (taps) located at different locations (e.g., switch(es) 106, host(s) 104*a-e*, and/or at network resources 125). This information can be processes to identify relevant information including a source, a destination, a requested service, a corresponding protocol, whether a communication is a request or a response, the time of the communication, or any other relevant information. Usually, the information is retrieved from captured network packets at one or more network devices (e.g., switches 106, host(s) 104*a-e*, and/or network resources 125). In some embodiments, states or state transitions can be detected by analyzing at least the communications over the network. In some embodiments, one or more agents on one or more computing devices might operate to capture various events (e.g., windows system events, syslog, sys call trace, authentication log, network traffic, etc.) for analysis against the detection signatures. In some embodiments, the detection signature is generated based on the software representation 140 and can be distributed to one or more locations. For example, various detection signatures might be distributed to respective hosts for local monitoring (e.g., of logs, application/system calls, system events, windows system events, windows system events, syslogs, sys call traces, authentication logs, network traffic, etc.). In this way different signatures can be distributed to corresponding devices within the network. In some embodiments, multiple different detection signatures can be generated to detect the same behavior in different ways or at different locations.

FIG. 1B illustrates an example arrangement of at least a portion of an architecture for network security management using the software representation that focuses on the security management system 100 according to some embodiments of the invention.

The security management system 100 as illustrated includes storage (see 110 and 120), a configuration to software representation generator 130, a fuzzer processing instance 134, a deployment manager 136, and a detection signature detection controller 138, which could be provided together or separately or in any permutation thereof.

The configuration to software representation generator processes the corresponding network policy 111 and network system configuration 112 to generate a software representation of the network system that can be compiled and executed using inputs from a fuzzer. For example, the configuration to software representation generator ingests the network configuration and network policy data, distills causal relationships from the network configuration and network policy, and projects the causal relationship into an intermediate representation layer, which is to say that the relevant information is processed to determine interrelationships that exist between identified entities. Details of this process will be discussed further below.

When representing an environment configuration as software, tools from the theory of computation, programming language theory, software quality assurance, etc., become potentially applicable to the configuration newly represented as software. Here, a fuzzer processing instance 134 can be used to generate data (e.g., vectors) that can be input into the software representation to determine respective paths that correspond to respective actions or properties leveraged that might be taken by users of the network system. Fuzzers are tools that mutate inputs to a computer program, in order to test its resiliency to errors. Commonly, fuzzers are used to test if variations in an input can result in a crash in the program. By identifying relevant states in the software representation (e.g., as high value states) a mutation engine such as a fuzzer can use seeds and other inputs to explore a software representation in the form of an executable. For instance, any state corresponding to an entity, and possibly one or more conditions (path based or based on global parameters), that is to be protected can be identified by a crash statement which may or may not be encapsulated within a conditional statement. These crash statements are then triggered when a fuzzer provides one or a sequence of inputs to the software representation that causes that crash statement to be executed. In response to the execution of a crash statement a crash report is captured which may comprise a full memory dump which may be processed to build a back trace. The back trace itself may comprise, or allow the determination of, all global variables (and whether those global variables changed during the execution) of the software representation as stimulated by the fuzzer along with the function calls and sequencing of those function calls. The seeds used by the fuzzer can be random, user-supplied, or previously generated by a fuzzer such as when a previous sequence or set of inputs that resulted in a novel or new code path being reached in the software representation is used as a seed for additional exploration. The seeds themselves can be represented as an input vector, either in full or in part, that gets parsed and consumed as a set of state-transition-state inputs and or one or more values for global parameters.

In some embodiments, the mutation process can be directed by encouraging candidate solutions that reach previously un-reached states of a program. Here, the fuzzer is repurposed to rapidly generate crash reports by treating the configuration-as-program (software representation) as a constraint satisfaction problem. For instance, if the software representation is based on data collected by ingesting an Active Directory configuration from an organization's computer network, the fuzzer can be used to determine whether or not an attack path exists whereby an attacker, starting at a particular host in the network with an initially compromised user-credential, can ultimately escalate their privileges to domain administrator. Identity snowball attacks such as these frequently allow attackers to iteratively elevate their privilege, until they ultimately reach their target. One way to represent the configuration as a program in order to answer this question is to structure the program to create a function for each entity (e.g., host, user, or service) in the system, where each of these functions can then make a call to other functions if the called function corresponds to an entity (e.g., host, user, or service) that can be compromised from the calling function. The question of whether or not an attack path exists between some starting entity to a high value state (e.g., a domain administrator), then becomes a question of whether or not a function representing the high value state (e.g., corresponding to a domain administrator), can be reached from the starting function representing the initial entity (e.g., host, user, or service) which may be determinable using a fuzzer.

Generally, fuzzers operate using one or more algorithms to determine what values to generate to stimulate a piece of software. For instance, a fuzzer might use random generation, a mutation engine, a concolic execution process, or a symbolic execution process to generate seeds and stimulate the software representation. Thus, fuzzers can be used to detect a sequence of state changes that could be used to reach a protected entity. For example, the software representation might include one or more crash statements that are triggered when a state representing a protected resource is reached and optionally subject to one or more additional conditions being met—e.g., credentials from a user account are used from a host to access the protected entity where that host is not previously associated with an account that has privileges to access the protected entity. When a crash occurs, debug tools can be used to capture the path that was taken to reach the protected resource by processing a memory dump in a corresponding crash report. This path information can be captured in a crash report at 121 in storage 120 which may also include summary data such as the number of times each crash statement is executed and the number of unique paths identified that triggered the respective crash statements. In some embodiments, the process identifies a portion of a stimulus applied to the software representation that resulted in a crash as a seed (e.g., a vector) for future fuzzing. For instance, if a new region not previously encountered is discovered, the path to that new region might be captured as a seed. This allows the fuzzer to focus the exploration on that region. Operation of fuzzers with regard to the software representation will be discussed further below.

The deployment manager 136 processes the crash reports to determine what information identified in the crash reports should be associated with a corresponding detection signature(s). Essentially, the deployment manager can analyze the crash reports to develop rankings of some or all of the crash report data as represented by one or more state transitions which may be identified in a set of candidate triggers (e.g., list) to determine whether a detection signature should be generated for the corresponding state-to-state (STS) transition. Detection signatures for selected candidate triggers are created using signature creation templates (see 124). Further details will be discussed below. Briefly, each crash report generated as a result of a crash might be analyzed to identify one or more state-transition-state tuples representing state-to-state transitions where a first state is a state the attacker could be in, the second state is the state the attacker can transition to, and where the transition is represented by an action or property that can be used by an attacker to transition from the first to the second state (e.g., a specific user uses and remote desktop protocol access rights to connect to a specific server).

The operation of the configuration executable translator 130, the fuzzer processing instance 134, and the deployment manager 136 can be managed by a security detection controller 138. For example, the security detection controller might initiate the process performed by the configuration to software representation generator 130 (e.g., to generate an initial software representation or to update an existing software representation to reflect changes in the network), control the execution of the fuzzer processing instance 134, and control the generation of detection signatures by the deployment manager 136. In some embodiments, the security detection controller 138 receives detection events from one or more deployed detection signatures and generates one or more alerts in response.

FIG. 1C illustrates an example arrangement of an architecture for network security management that focuses on the security management system 100 according to some embodiments of the invention. FIG. 1C is largely the same as FIG. 1B and thus the description of elements having the same identifier to those illustrated in FIG. 1B also apply to FIG. 1C.

However, FIG. 1C in contrast to FIG. 1B includes a workload distributor 132 and multiple fuzzer processing instances 134*a-n* (e.g., multiple fuzzers as discussed above in regard to fuzzer 134). In particular, the workload distributor can instantiate multiple fuzzers processing instances (see 134*a-n*) that can each generate inputs for use in stimulating the software representation. For example, multiple fuzzer processing instances might be created to generate random inputs, to generate inputs based on one or more seeds with a mutation engine, use a symbolic approach to generate inputs, or a concolic execution process to generate inputs. Each fuzzer instance may be located on the same or on different underlying hardware. For example, a single fuzzer may be instantiated on each of a set of computing devices. Alternatively, different numbers of fuzzers may be located on different computing devices based on available resources (e.g., percentage values representing consumption of resources on available computing devices or based on other values such as the number of idle cores or virtual machines available. In some embodiments, the workload distributor issues one or more seeds to different fuzzer processing instances.

In some embodiments, the storage 120 comprises a share directory where multiple fuzzer processing instances 134*a-n* can collectively share data such as the seeds 122 and generate a single repository of crash reports. In some embodiments, the workload distributor issues one or more seeds to different fuzzer processing instances from the shared data.

FIG. 2 illustrates a process flow according to some embodiments of the invention. Generally, the flow comprises interrelated steps to generate and analyze network information, manage the creation of detection signatures, monitoring those detection signatures for activation, and processing detection events from detection signatures. Some embodiments may also include one or more of monitoring the network for policy or configuration changes, monitoring detection signatures for retirement, and analyzing the software representation to create event responsive detection signatures.

The process generally starts at 200, where a software representation of the network is generated. This process will be discussed further below. Briefly, the approach identifies entities (e.g., resource that may be protectable) and generates functions that represent each entity as one or more states where transitions between states may occur based on one or more access rights or properties. Each function may be populated with a selection statement that corresponds to respective function calls, where the selection of a function call from within the selection statement is determined based on a corresponding access right, property input, or combination thereof, into the selection statement (e.g., a fuzzer might provide an input to the software representation that corresponds to one of the selection statements to cause a state-to-state transition).

In some embodiments, the network is monitored to detect policy or configuration changes at 201. In the event that such a change occurs the process at 200 can be used to regenerate the software representation. This is important, especially when a user's privileges have been revoked (e.g., a high-level employee leaves the company) because the network security management activities should reflect that revocation. In some embodiments, a detection of a change to the network policy or network configuration data may cause a complete regeneration of the software representation. In some embodiments, the change may be identified and the corresponding function or functions may be identified for removal from or modification of the software representation. In the event that the change in the network policy or configuration will result in the generation of a new function or modification of an existing function, one or more seeds can be identified in order to limit the subsequent processing of the software representation using a fuzzer to the changed functions (e.g., for crash report generation and or management of detection signatures for deployment). In some embodiments, changes to the software representation can be at least partially captured within the software representation in order to maintain and restore associations between collected information and current information. For example, if a change causes a particular state-to-state (STS) transition to no longer be possible (e.g., an access right is revoked) the corresponding transition might be commented out by the configuration to software representation generator 130. Similarly, a change that causes the restoration of a previously removed (commented out) STS transition might be implemented by uncommenting the previous commented section. Additionally, in some embodiments, whenever a modification results in the creation of a previously unidentified STS transition, that transition is added to the software representation and selectable using an input not previously associated with a different transition. In this way, changes to the network configuration data and network policy data do not cause a reshuffling of the approach that leverages use of commenting out no longer existing portions can be used to maintain consistency within the software representation to maintain the applicability of the previously generated crash reports, seeds, trigger candidates and any associated learning or rules to remain applicable. In some embodiments, crash reports generated for a previous iteration of the software representation can be replayed to validate whether that crash report corresponds to a currently valid path (potential attack path).

At 202, the software representation is analyzed using one or more fuzzers to create crash reports. This process will be discussed further below. Briefly, entities are identified for protection. Corresponding functions and conditions are then identified for the entities identified for protection. Crash statements are then inserted into the identified functions. In some embodiments, execution of the crash statements is conditioned on one or more global parameters. Thus, when the process reaches that function corresponding to a protected entity and any corresponding conditions are met, a crash statement is executed. This causes the system to dump the memory state which can be collect in a crash report or processed to create a back trace for storage in a crash report of the activity that resulted in that crash (see Crash Reports 121).

At 204, the crash reports are analyzed to determine what detection signatures if any should be generated to detect behavior corresponding to at least a subset of the crash reports. Briefly, processing of the crash reports may include any of removing loops from within a sequence of state-to-state (STS) transitions where the relevant state and parameters are the same at the start and finish, application of one or more rules, removal of STS transitions that do not have a matching detection signature template, expanding one or more groups of users/machines to their members, removing STS transitions that may correlate only to a known threat or known risk that a user does not want to detect (e.g., an Active Directory server syncing with another Active Directory server). After the initial processing, one or more rules are then applied to select for different STS transitions or sequences of STS transitions. For example, Application of the rules might be used to control a process to analyze the identified chains of events and select specific STS transitions (or sequences thereof) that are the most prevalent (e.g., using a ranking process based on the number of crash reports within which each STS transition or sequence thereof is identified). In some embodiments, once a particular state-to-state (STS) sequence is covered by a threshold number (e.g., 3) of detection signatures, that STS sequence is removed from further analysis for sequence generation (e.g., removed from a global list of STS sequences to be processed). In some embodiments, the STS sequence selection is stopped when a maximum number (threshold) of STS sequences or corresponding number of detection signature are identified, when each STS sequence (or corresponding entity) is covered by a threshold number of detection signatures, or some combination thereof. In some embodiments, STS transitions are ranked based on one or more metrics and a number of detection signatures are then generated using corresponding detection signature templates. These detection signatures may, for instance, specify the set of events that are most frequently identified as leading to a critical state in the environment as reflected in the crash reports. In some embodiments, the detection signatures identify singular actions, a sequence of actions, or repetition of the same action. Further details on the selection of candidate triggers for signature creation is discussed below. Once generated the detection signatures can be deployed at one or more appropriate locations within the network at 206. In some embodiments, a single detection signature is generated for a corresponding behavior. In contrast, in other embodiments, multiple detection signatures are grouped together to detect a corresponding behavior. In some embodiments, activity may be detected using multiple different detection signatures that are aggregated together (e.g., logically linking detection signatures my making the activation of one detection signature dependent on the prior activation of another detection signature). In some embodiments, detection signatures may even be paired in a database such that when one signature is detected a verification can be performed as to whether the pair of that signature is also detected. Such mechanisms can be used to validate whether the corresponding detection signatures are operating correctly.

At 209, detection signatures are monitored for retirement. There are various reasons that a detection signature is to be retired including when those signatures time or age out, and when they correspond to a trigger or resource that no longer exists in the software representation or network. Additional details discussed below in regard to FIG. 9.

At 210 detection signatures that have been activated are processed. Additional details will be provided herein. However, generally, the signatures are processed to determine if any alert should be generated (e.g., to an administrator), whether any automated action is to be taken (and potentially taking that automated action), and to determine whether additional resources should be directed towards entities potentially at risk by the behavior. Additionally, due to the atomic nature of the detection signatures it becomes possible to create a distributed ingestion engine, which runs on multiple machines or servers. For instance, signatures can be run on individual computers themselves (when the detection signature pertains to, for example, windows event log data, log-on events, windows system events, syslog, sys call trace, authentication log, network traffic, etc.), or alternatively can be run on sensors (e.g., a computing device that is solely dedicated to capturing and processing data to provide to the monitoring system) either on a customer network or in the cloud. The common format of the detection signatures allows for the ingestion function to be distributed across any number of machines or environments, where when a detection signature is activated and generates a detection event, a related log entry can be created and a unique identifier for the detection signature can be returned to an aggregation engine for further processing. For example, when a detection signature is activated, the approach at 207 may implement a process to deploy additional detection signatures logically between the triggered detection signal and one or more protected resources as determined using the software representation. In this way, when a potential threat is identified resources can be tailored to detect further intrusion or progress by a malicious actor towards compromising that resource. Further discussion is provided below in regard to FIG. 8.

Figure 3B:
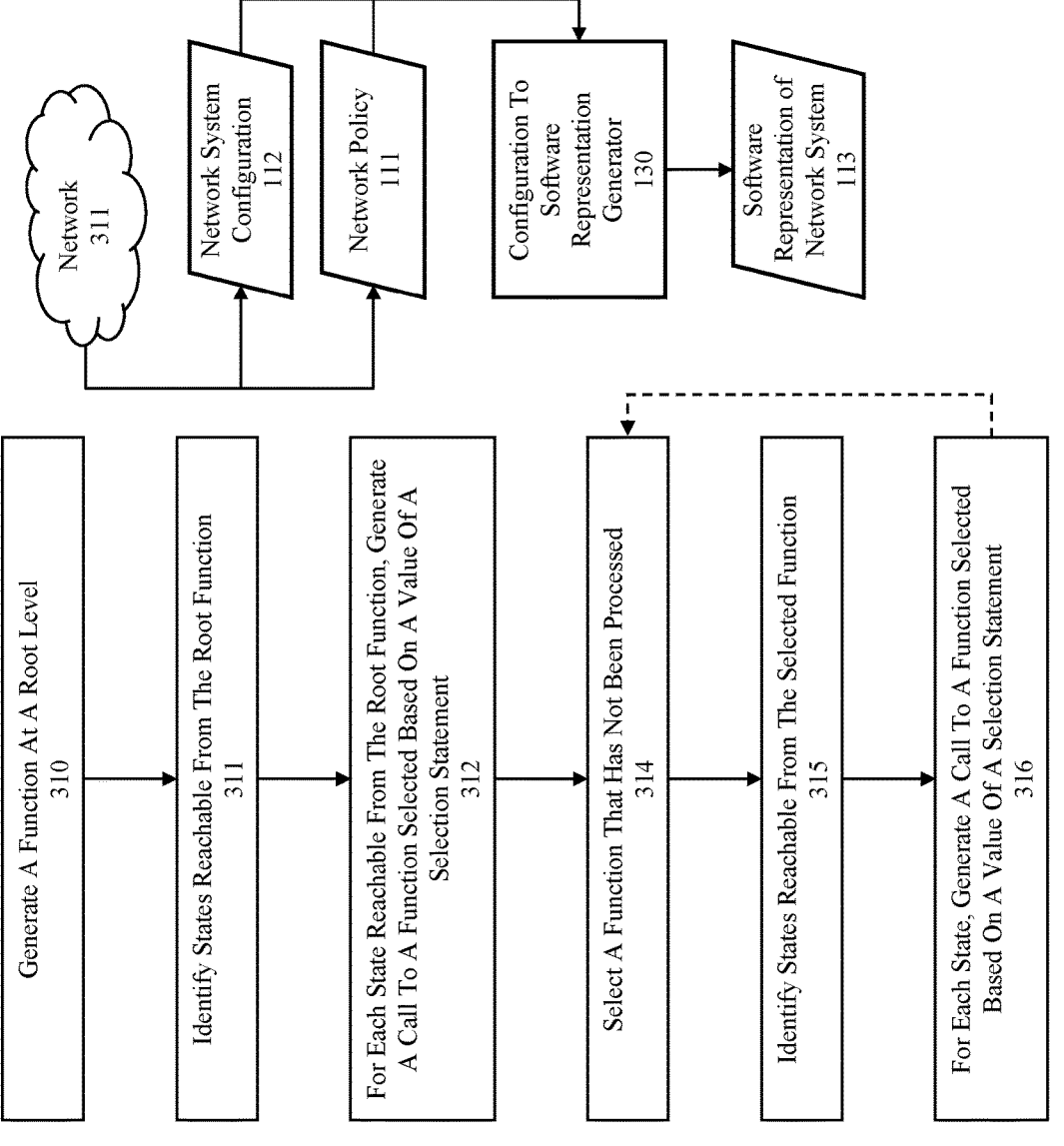

FIGS. 3A-3B illustrate an expanded view for generating a software representation of a network according to some embodiments of the invention.

FIG. 3A illustrates the process for generating a software representation of a network according to some embodiments.

The process starts at 300 where data is ingested into the system in a form that is processible by the system and includes information pertaining to interrelationships between entities. For example, the network system configuration 112 and network policy 111 might be read into memory for processing by the configuration to software representation generator 130. In some embodiments, this process includes identification of the entities, the global parameters, and the transitions.

At 302 the entities and interrelationships are represented. For example, the network system configuration 112 and network policy 111 might be parsed to generate a plurality of separate objects (State-Transition-State tuples) that represent interrelationships between entities. For example, lists generated at 300 might be used to generate a list of state-transition-state tuples that specify which STS transitions are possible—e.g., a relational database table might be generated that includes three or more columns where one column comprises the source state, another column comprises the destination state, a third column comprises a transition or property, and one or more other columns represent global parameter values that must be satisfied for the transition to occur. In some embodiments, the State-transition-state tuples might be represented in a set of commas separated values (e.g., a csv file). In some embodiments, the ingested data is converted into two sets of data, first a set of entities represented by that data (e.g., a list or table), and a set of relationships between those entities (e.g., a collection of three values, two of which are entities and one of which is a relationship between those entities). Here each entity might comprise a computing device, user, domain, group policy object (GPO), key vault, subscription, tenant, resource group, application, virtual machine (VM), group, or organizational unit (OU), or any other entity which may be represented in a network system configuration 112. The relationships between entities might comprise access rights or properties that one entity can use to interact with another entity that may be identified based on the network system configuration and the network policy (e.g., "AddMember", "Admin", "AdminTo", "All", "CanRDP", "CanPSRemote", "Contains", "Delegate", "Execute", "ExecuteDCOM", "GetChanges", "GetChangesAll", "HasSession", "Link", "Member", "Owns", "RemoteControl", "ResetPassword", "SQLAdmin", "Write", etc.). To illustrate, "Contain" is a property that indicates the inheritance of a configuration, whereas "AdminTo" indicates an access right, while both "Contain" and "AdminTo" allow control over a target entity.

Once the entities and interrelationships are generated, they can be converted into a collection of interrelated functions, where each function contains a collection of function calls that are selectable based on a transition or property identified. The selection of respective functions call is to be based on inputs representing usage of an action or property corresponding to a transition to simulate an interaction. In some embodiments, the selection is based on one or more global parameters. In some embodiments, the set of function calls are embedded within switch statements where different functions are called to simulate different behaviors—e.g., identifying a corresponding from state and a corresponding to state that is reachable based on the corresponding transition or property.

FIG. 3B illustrates the process for generating a software representation including calls to other states based on the relationships between entities according to some embodiments. The example illustrated herein is directed towards the approach to generate functions as discussed above where a function that is initially reachable as a starting point may not include a transition or property identification in the function call (e.g., SOURCE_STATE or SOURCE_STATE_Entry) and a function that is reachable from another function different from the root function is identified by SOURCE_S-TATE_TRANSITION/PROPERTY where that Entry identifies the transition or property used to reach that SOURCE_STATE_TRANSITION/PROPERTY.

The process starts at 310 where a root function is generated. The root function essentially comprises a blank or default state that generically corresponds to all the entities in the network and where certain states may be identified as starting states that can be reached from the root function. However, the root function does not itself correspond to an entity to be protected.

In some embodiments, at 311, the entities reachable from the root function are identified (e.g., those that can correspond to starting states). For example, states corresponding to entities such as user accounts may be reachable from the root function because the first thing that a user, host, or service does is attempt to gain access to desired resources (e.g., using a user account to access an email server). At 312, function calls are inserted into the root function where each function call corresponds to a state, a set of conditions, and is independently selectable (e.g., using a switch statement similar to those discussed above in regard to FIG. 3A). In some embodiments, each function name for each function call is added to a list of functions to be processed.

The function generation process for the remainder of functions is essentially equivalent. First, at 314, a function is selected for processing (e.g., from a list of functions to be processed that identifies the function name). The function call specified in the list of functions is used to generate a shell for the function. The corresponding state for that function (e.g., identified from the function call) and the states reachable from that function are identified at 315. For example, the functions reachable, and the corresponding transition or property utilized to reach a respective function, is identified from a list or other data structure that indicates the STS transitions (e.g., embodied in a plurality of State-transition-state tuples in a table).

At 316 the functions that are reachable from the selected function are represented as one or more function calls selectable based on an input to a switch statement in the selected function. Each such function call is compliant with a specification that forms the function call (e.g., SOURCE_STATE_TRANSITION/PROPERTY). In the present example, each function call identifies a source state which is the state of the called function. Thus, each function represents a source state and possible destination states that can be reached from any particular source state where the destination states are identified in the function call as a source state. Logically, this is because each function is both a destination and a source. However, because the function call is intended to identify the state that is being transitioned to this is included in the function name and not the calling function. In some embodiments, each function call is processed to determine whether that function call is already on a list of processed or to be processed functions—and added to said list when not already processed or in the list.

In some embodiments, the functions may be interrelated such that one function might be reaching from multiple different paths which may or may not including one or more loops (e.g., sequence of STS transitions that reaches a particular state more than once).

In some embodiments, each entity reachable from the root might correspond to one or more conditions that must be met to reach said entity which may be represented in the select statement. In some embodiments a single state, or function, is used to represent each entity. In some embodiments, an earlier reached entity can be reached from a later reached entity. Such processing may result in different states (corresponding to different entities) being reachable from a current state subject to some modified conditions which may be reflected in an additional function call dependent on one or more different conditions. For example, a first user function is selected. That first user function might correspond to a user that is a member of one or more groups with corresponding group policies. These group policies that the user is a member of correspond to a set of function calls are then generated within a selection statement at 316. For example, these group memberships might be usable to reach another host or service represented as a different function, and that host or service might also include additional rights or credentials which might be usable to reach the same or a different user function, possibly after modification of a relevant property (e.g., a change of rights) or to a user with a different set of rights—which might be representative of an elevation of or change of privilege (either malicious or otherwise). Similarly, some accounts might also be associated with other accounts—e.g., one user account might be usable to control another user account, or one group might be defined by membership in another group. In this way, multiple interrelationships can be mapped to these functions. Thus, the network system configuration 112 and the network policy 111 are be translated at 130 to generate a software representation that can be compiled and executed (see 113). In some embodiment, various global parameter can be generated to represent network wide configuration information, such as a firewall state. Furthermore, the switch statements can include conditional statement that depend on a global or local parameter.

Figure 4A:
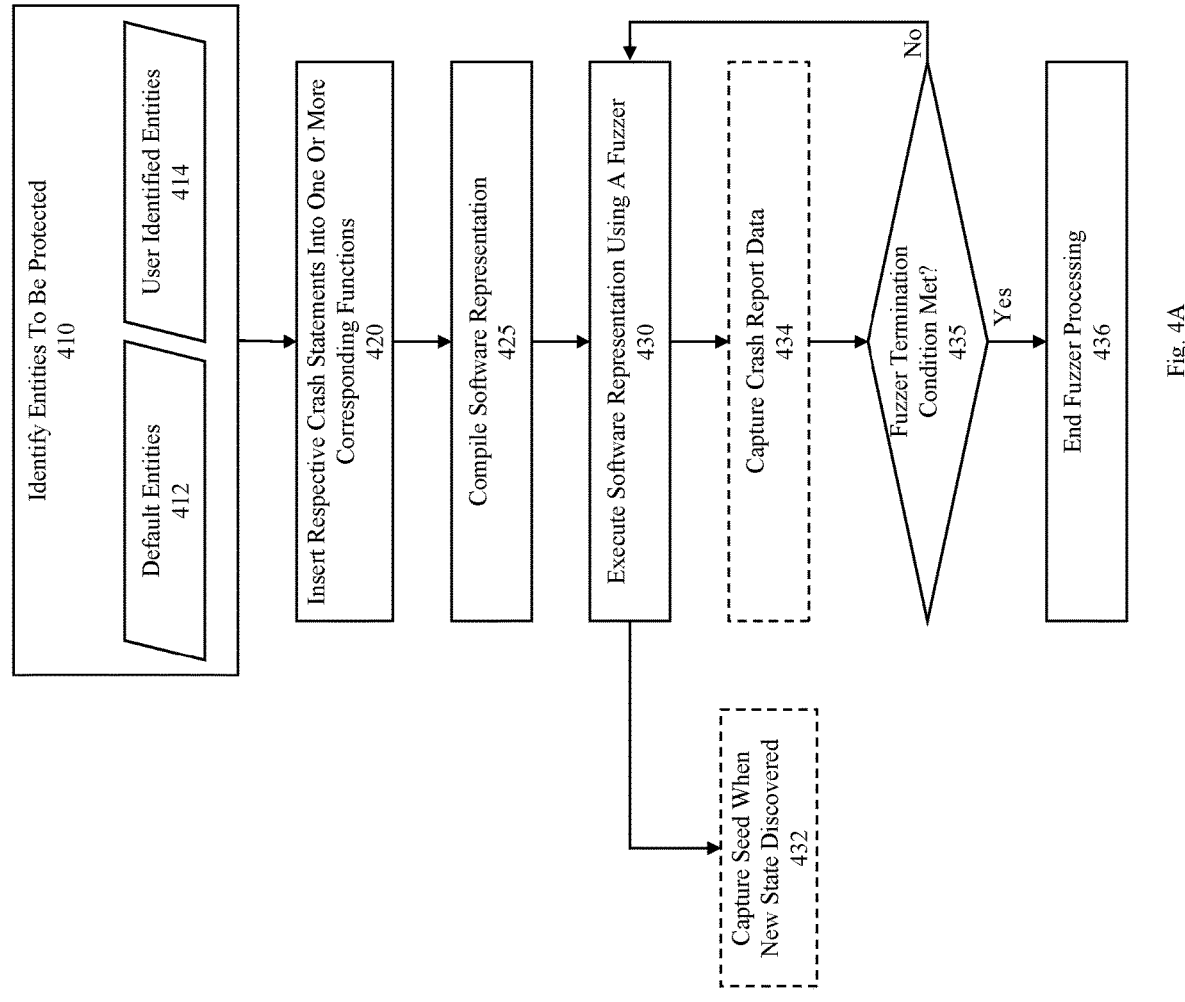

FIGS. 4A-4B illustrate an expanded view for analyzing the software representation of the network to create crash reports according to some embodiments of the invention.

At 410 respective entities in the network are identified for protection. The entities might be identified based on a set of default entities types or rules 412 (e.g., files servers, active directories, tokens services, or other authentication services), and are identifiable by parsing the network system configuration and the network policy. Additionally, a user might identify any entity that they desire to protect (see 414). In some embodiments, different resources (e.g., a server or account) that might be protected could be identified by a user. In some embodiments, a user may also be able to attribute a level of sensitivity of a resource. For example, a server holding crypto material, financial documents, or event specific user mailbox might be identified as being highly sensitive by a user.

Once the entities are identified for protection, crash statements are inserted in the corresponding functions at 420. In some embodiments, execution of the crash statements is subject to one or more conditions. These conditions can be encoded within the software generated itself with the engine verifying whether it is possible to have multiples conditions that are all satisfied at the same time and a crash is achieved only when all conditions are satisfied. As discussed herein, the crash statements can be used to cause the capture of a crash report which may be processed to determine sequences of behavior that might result in the compromise of a resource.

For example, working with the example from Table 1, a state F might be associated with a crash statement. There are multiple ways in which a crash statement might be included. The first is to include a function that will always cause a crash once the function is reached and might comprise any of the following:

```
int F ( ){
     CRASHER ( ) ;break; // Always Crash
     Return 0;
}
int F_OWN ( ){
     CRASHER ( ) ;break; // Always Crash
     Return 0;
}
int F_ADMIN ( ){
     CRASHER ( ) ;break; // Always Crash
     Return 0;
}
```

Additionally or alternatively, a crash may be conditioned on one or more inputs and included as part of a state representation that allows other STS transitions without crashing. For example, as follows where case 3 may be conditionally selected based on an input or global parameter):

```
int F ( ){
     switch(input){
          case 0: F_ADMIN ( ) ;break; // Member
          case 1: A_ADMIN ( ) ;break; // Member
          case 2: C_ADMIN ( ) ;break; // Member
          case 3: CRASHER ( ) ;break; // Member
     default: break;}
     Return 0;
}
```

Here, the CRASHER function is a function that raises a SIGABRT. As illustrated here, a crash statement may be inserted in any function and its executed may be dependent on any combination of current state, a called state, a global parameter, a previously called state, or any combination thereof. In some embodiments, a different function or signal might be raised. For example, any interprocess signal can be used to identify the "crash" and used to collect relevant information. Here, SIGABRT is used because it can be used to cause the creation of a process dump used for generation of the crash report. However, any other relevant technique may be used for this function.

Once the modified version of the software representation that includes one or more crash statements is created, it can be compiled to allow for execution thereof at 425 using one or more fuzzers to generate inputs. As discussed herein the functions can be passed one or more inputs in a function call, or receive one or more inputs from a data structure (e.g., inputs can be provided by passing a pointer to a called function or inputs can be provided by reading an input provided in an input stream. Regardless of how the input is made available to the function, the inputs are generated by one or more fuzzers and are used to evaluate each respective switch statement as appropriate when the modified version of the software representation is compiled to allow for execution thereof at 425.

Fuzzers are tools that mutate inputs to a computer program, in order to test the programs resiliency—e.g., fuzzers generate various inputs in an attempt to crash a program. The mutation process can be directed, for example, by encouraging candidate solutions that reach previously un-reached states of program. Here, the use of the fuzzer on the software representation (see 430) treats network security as a constraint satisfaction problem. For instance, the software representation can be used to determine whether or not an attack path exists whereby an attacker, starting at a particular host in the network (e.g., with an initially compromised user-credential), can ultimately escalate their privileges to a protected resource (e.g., a domain administrator). This question can largely be answered by determining whether or not an attack path exists between some starting state (e.g., a first function) and the protected entity as represented by a state having a corresponding crash statement (e.g., a high value state). Furthermore, by translating the configuration and its constraints into a program, application of a fuzzer enables querying and finding solutions to questions for which the program was structured. There is no requirement that a formal axiomatic system first describe the domain to which the solver is being applied.

At 430 the process executes the software representation using a fuzzer to generate input for the software representation. In certain circumstance, the input from the fuzzer will not result in any functions being called. However, some inputs may result in one or more function calls which may eventually result in the software representing reaching and executing a crash statement. Upon execution of the crash statement at 434 a memory dump is generated and used to create a crash report—e.g., by directly storing the memory dump in the crash report or by processing the memory dump to determine the sequence of state transitions that occurred to reach the crash statement. In some embodiments, multiple fuzzers instances operate in parallel on the software representation—e.g., use copies of an executable form of the software representation.

At 435 a determination is made as to whether a termination condition has been met for the fuzzer. The conditions might comprise any of a number of seeds identified, a number of executions since a seed was identified, a number of crashes captured, a ratio of based on a number of entities to be protected, a number of iterations since a new input or sequence of input has been identified in a crash report, a percentage of the software representation explored, a determination of a threshold convergence level (e.g., as reflected by a number of iterations since a new crash or sequence is encountered), or any combination thereof.

In some embodiments, the conditions for termination can be tied to the selection of a different fuzzing technique. According to some embodiments, the inputs to the software representation solely determine the code path executed (e.g., by means of conditions such as in if statements). The fuzzer then mutates this input, and generates alternative inputs that execute differing code paths. Such an organization allows for the input to be deterministically replayed so that the states previously visited can be revisited using a seed. Furthermore, by structuring the input such that it uniquely encodes a path through the code (where such paths represent candidate solutions), the fuzzer can be parallelized over arbitrary numbers of cores, processors, graphics processing units, and solvers, etc. Additionally, because the input defines the code path, sharing of partial solutions, or otherwise interesting seeds, can be done by sharing the input itself. No coordination or organization is needed between any of the parallel instantiations. In fact, the set of solvers operating in parallel need not even be of the same type. For instance, the fuzzers might comprise any of a randomized data generator, a mutation engine, concolic execution unit, or a symbolic execution unit. However, each approach has different resource requirements with the random approach being the least resource intensive and the symbolic execution approach being the most resource intensive. Thus, the process might initially operate using a randomized data generation approach. After a condition is met that approach might be switched to a mutation engine followed by concolic execution, and/or symbolic execution as determined based on the then current conditions. Finally, in some embodiments, the approach might include previously generated partial and/or complete solutions found during a previous iteration—e.g., such as when a configuration change occurs, where previous solutions that do not result in a crash may no longer be relevant and may indicate that the corresponding resource has been removed from the network. However, if at 435 it is determined that a fuzzer termination condition has been met, the process ends at 436.

In some embodiments, new seeds are capture when a new state is discovered as a result of the stimulus from the fuzzer at 432. The seeds may be stored in seeds 122 which may be accessible by multiple fuzzer instances. As will be discussed further below, the seeds can be used by the fuzzers to guide the fuzzers to explore regions of the software representation that are logically beyond the seed.

FIG. 4B illustrates an example approach for fuzzer processing of the software representation of the network to create crash reports according to some embodiments of the invention.

The approach illustrated here starts at 450 where a set of current fuzzer metrics are identified. For example, the fuzzer metrics might comprise any of the following: a number of iterations, a software representation coverage percentage, number of crashes reached, an average number of routes to each crash identified, a number of iterations since last crash, trend data for any of the above, a number of execution cycles since a new path or crash has been found, or some combination thereof as illustrated at 451.

At 452 a fuzzer algorithm is selected from a set of available fuzzer algorithms. For example, the fuzzer algorithms could comprise random, mutation, concolic, or symbolic fuzzing approaches as discussed here. Generally, each algorithm will require differing amounts of resources for respective iterations. Because of this, each fuzzer algorithm may be more ideal given one set of conditions vs another fuzzer algorithm. For instance, a random algorithm likely has the lowest resource requirements. Thus, an initial selection of a random algorithm may provider the greatest amount of discovery of the configuration space for the least amount of processing resource. However, the productivity of a purely random approach tends to drop off after a period of time. At which point another algorithm might be selected such as a mutation algorithm where when new regions are discovered the mutation engine can use a seed to focus exploration on those regions. A symbolic approach might be used prior to the concolic approach where a range of possible inputs are used to identify a valid subset thereon— e.g., a symbolic approach might keep different values and their relationship in a pool of all possible values to achieve a specific state which may be executed using a parallel processing approach and seed sharing. A concolic approach might be used to inject a known value to reach a specific know state in the software representation and then additional variation is then applied for further exploration from the known state—e.g., a concolic approach might be used to identify seeds to use in the same or other fuzzers. In some embodiments, multiple fuzzers are distributed across a plurality of different processing resources (e.g., separate cores, central processing units, graphics processing units, memory, and storage), where each fuzzer may be operating using the same or different fuzzer algorithms.

Once the approach is identified the process continues at 454 where the fuzzer output is generated using the selected fuzzer algorithm(s). In some embodiments or algorithms, a seed 453 may be applied. Here the seed comprises a vector that represents one or more input values that can be input into a software representation. The seed or an input vector as used here might further comprise a first portion corresponding to global parameters and a second portion corresponding to actions or properties that might be used to cause one or more state transitions on the entities in the network. These global parameters may correspond to one or more conditional statements which may render different entities reachable (e.g., if a firewall is off then additional entities/functions might be reachable). At 456, this sequence and any corresponding global parameters are input into the compiled software representation. The compiled software then executes by performing a plurality of evaluations to determine which functions to call based on the input values. In some embodiments, the output of the compiled software representation is solely dependent on the input from the fuzzer.

At 458 the execution of the software representation is monitored. In some embodiments, a single input is provided to the software representation where that single input may cause a crash. If a crash is caused it is capture at 434 as discussed above. Additionally, if a state change is identified that corresponds to a state not previously discovered, the sequence of inputs that lead to that state change may be captured in the form of a seed at 432 which may later be provided at 454. Additionally, when multiple fuzzers are supported, the approach may maintain seeds in a shared storage structure (e.g., storage 120 embodied as a shared directory). In some embodiments, the fuzzer may generate an input separately where a single input is provided, followed by an additional input in an input stream when no crash is detected. Thus, the approach can present as a loop where, an input is provided, then another, and another, and so on until either an iteration limit is reached or a crash occurs. Such an approach is presented here as a loop comprising 454, 456, and 458. In some embodiments, the fuzzer generates a single input (e.g., a vector) which may correspond to any number of sequential operations, and where one area of variation generated by the fuzzer is the number of sequential operations to which the fuzzer output corresponds.

At 460, fuzzer metrics are collected and updated. This may include updating any of the fuzzer metrics discussed herein such as in regard to 451. Additionally, the fuzzer metrics may be used as discussed above in regard to 435 to determine whether the fuzzer algorithm may advantageously be changed by returning the process to 452.

FIGS. 5A-5B2 illustrate an expanded view for managing detection signature deployment according to some embodiments of the invention.

FIG. 5A illustrates a first portion of an approach for managing detection signature deployment according to some embodiments of the invention. The illustrated approach comprises a process for determining whether a detection signature can be generates for the corresponding candidate trigger.

The process states at 500 where one or more entities are identified for monitoring. In some embodiments, this merely comprises all entities identified in 410. However, in other embodiments, the entities comprise a subset of the entities identified in 410. For example, a user might decide to initially roll out protection only for Active Directories. Thus, the user could select or otherwise identify any active directories for monitoring. In addition, this approach can be useful for focusing detection resources where they are perceived to be more useful. For example, if a potential breach is identified as being in progress (e.g., because an actor has completed a subset of the steps that would enable that attacker to reach a protected entity) the current state reached by the attacker, or a sequence of actions used or necessary to reach that state could be captured as a seed. That state or seed could then be used to analyze the software representation to determine resources that are reachable from that state including a minimum distance required (distance here being a number of STS transitions corresponding to function calls). Those identified resources might then be analyzed to create a set of detection signatures that provide further protection. This could also be combined with further exploration of the software representation using one or more fuzzers as discussed above. In some embodiments, instead of using a seed-based approach, the software representation can be configured to have a starting state that is at the corresponding state (e.g., the state corresponding to a potential breach that is in progress) and that has the same global and local parameter values.

In some embodiments, once the entities to be protected are identified corresponding crash reports are identified and processed into one or more candidate triggers at 502. For example, a single crash report might comprise any number global or local parameters (and possibly changes thereto) corresponding to one or more function calls in the software representation. Any combination of the global parameters, local parameters, or state-to-state transitions can be selected as a candidate trigger, whether comprising a single state-to-state transition or multiple state-to-state transitions. For example, a sequence corresponding to three state-to-state transitions (e.g., from a1 to a2, a2 to a3, and a3 to a4 in that order) could be used to generate a number of candidate triggers by capturing the individual transitions or by capturing a sequence of transitions (e.g., any of {a1 to a2 to a3 to a4}, {a1 to a2 to a3}, {a1 to a2 and a3 to a4},{a2 to a3 to a4}, {a1 to a2}, {a2 to a3}, or {a3 to a4}). In some embodiment, each STS transition might be associated with one or more global parameters which must be matched (to satisfy a condition) to make any particular STS transition possible. In some embodiments, a threshold number of STS transitions might be required for each trigger candidate (e.g., 3). In particular, in some circumstances, as the number of STS transitions increases the likelihood that detection of corresponding activity is malicious also increases. Thus, in some embodiments, a threshold number of STS transitions might be required for each candidate trigger (e.g., threshold number of STS transitions in a sequence).

The candidate triggers identified at 500 and/or 502 are then processed at 512, 514, 515, 516, and 517 using an inner and outer loop. At 512 a first or next corresponding candidate trigger is selected. Once selected, the candidate trigger is analyzed to determine whether the candidate trigger corresponds to a transition that can be detected in the environment. Here, this comprises determining whether a detection signature template exists that can detect the corresponding transition for the entities represented by the candidate trigger. If the candidate trigger can be implemented as a detection signature as determined based on the existence of a matching detection signature template, then at 515 the process continues to add the candidate trigger to a list of implementable candidate triggers at 516 (see also candidate trigger list 122). In some embodiments, if only a portion of a candidate trigger is determined not to be implementable, the candidate trigger is only added to the list of implementable candidate triggers if a threshold number of STS transitions determined to have corresponding detection signature templates. In some embodiments, one or more STS transitions are whitelisted to avoid further use. In the event that a white list is implemented, the white list is used to identify matching candidate triggers where those matching candidate triggers are excluded from the list of implementable candidate triggers. In some embodiments, detection signature templates that are unreliable or otherwise difficult to implement (e.g., the require consumption of too much resources, require access to a device that is not accessible, or then provide inconsistent detection) are removed from the set of detection signature templates used to determine whether a particular candidate trigger is implementable. Finally at 517 if there are additional candidate triggers to be analyzed, the process returns to 512. Otherwise, the flow proceeds to a trigger selection process.

FIG. 5B1 illustrates a second portion of an approach for managing detection signature deployment according to some embodiments of the invention. In some embodiments, all candidate triggers that can be used to generate a detection signature are generated and deployed. However, in some embodiments, the number of detection signatures deployed at any one time may be limited to manage resource consumption of the security processes and latency of the time to process network events to determine whether they trip a detection signature. The present figure provides an approach to rank the candidate triggers to allow for selection of a limited number of candidate triggers and thus the generation of a limited number of detection signatures.

The approach starts at 522 where the candidate triggers previously identified (e.g., as discussed above in regard to FIG. 5A.) are evaluated. Candidate trigger evaluation may be performed in any number of ways. For example, candidate triggers may be evaluated based on any metrics such as a number of protected entities (determined based on corresponding states) that are reachable from the last state of the candidate trigger, a logical distance to a protected entity (e.g., minimum number of STS transitions to reach a state corresponding to the protected entity), a number of other candidate triggers or corresponding crash reports that share the same candidate trigger, minimal coverage level of an entity identified for protection, minimal depth of STS transitions per trigger (e.g., minimum number of states traversed to minimum number of STS transitions), prevalence of occurrences in the environment, deployment difficulty (e.g., where a trigger might be difficult to deploy due to encryption of relevant information or data obfuscation), or any combination thereof. In some embodiments, actual or inferred counts or frequencies might be generated (e.g., based on historical triggering data). This can be used to avoid the selection of a candidate trigger that would correspond to a detection signature that would be constantly tripped.

The candidate triggers may be processed on an entity-by-entity basis as indicated at 530, or as a whole, or some combination thereof. The process starts at 532 where a number of best ranked candidates are selected.

In the case of processing the resources as a whole, a number of the best ranked candidate triggers are selected. However, while processing the candidate triggers as a whole allows for leveraging of trigger candidate STS transition overlap it does not guarantee that each protected entity is associated with a minimum number of detection signatures or candidate triggers.

When the individual entities are processed separately, the best ranked candidate triggers are selected for each respective entity (e.g., candidate triggers that were identified from a crash report corresponding to the respective entity). For example, the candidate triggers may be processed first by selecting the best candidate triggers for each respective entity (e.g., the best 25 as ranked based on the number of crash reports including the corresponding sequence of STS transitions). In some embodiments, a selected candidate trigger for one entity might overlap with some or all of the selected candidate triggers for another entity—e.g., due to one or more shared routes to the entities as represented by the software embodiment of the network. In some embodiments, once each individual entity has a minimum set of candidate triggers selected, a second pass can be performed to select the best overall candidate triggers. Overall candidate triggers may and likely will overlap with at least some of the candidate triggers selected for other entities.

In some embodiments, the best overall candidate triggers might be selected first followed by selection of candidate triggers for respective entities. In some embodiments, the candidate triggers selected can be selected only once. For example, the overall best candidate triggers are selected (e.g., number selected=x*the number of entities to be protected), and then candidate triggers selected for respective entities are selected that do not overlap with the overall best candidate triggers. In some embodiments, an enforcement mechanism is provided to force candidate triggers selected for one entity not to overlap with candidate triggers selected for other entities. In some embodiments, a relative importance (e.g., weight) might be applied to each entity to be protected and used to determine a number of candidate triggers or detection signatures to be allocated. For example, a maximum number of candidate triggers or detection signatures might be identified from which a portion is allocated to protection of each entity that is proportional to each entity's relative importance. In some embodiments, the relative importance is inversely proportional to the number of STS transitions, or sequences thereof, selected for generation of detection signatures.

Once candidate triggers are selected, they can be converted to one or more deployment signatures at 534. This process is discussed further in regard to FIG. 6. Briefly the candidate triggers are mapped to their corresponding actions or properties which are then used to select one or more detection signature templates that can be tailored to detect the indicated activity when deployed at a corresponding location—e.g., within a host in the network. Finally at 536, the generated detection signatures are deployed at corresponding locations.

FIG. 5B2 illustrates a second portion of an approach for managing detection signature deployment according to some embodiments of the invention.

As with FIG. 5B1, FIG. 5B2 illustrates an approach that ranks candidate triggers based on one or more metrics at 522 (see description of 522 in regard to FIG. 5B1), selects a number of best ranked candidate triggers at 532 (see description of 532 in regard to FIG. 5B1), generates deployments signatures at 534 (see description of 534 in regard to FIG. 5B1), and deploys the generated deployment signatures at 536 (see description of 536 in regard to FIG. 5B1). However, in contrast to the approach illustrated in FIG. 5B1, the approach illustrated here implements a looping process that ranks at least a subset of the candidate triggers based on what candidate triggers have already been selected until a maximum number of candidate triggers are reached at 535. For example, candidate triggers may be ranked based on at least a number of protected entities, or paths there to, that might be compromised using a state-to-state transition (e.g., a state-to-state transition or sequence thereof that may be used to compromise a protected entity).

Figure 6:
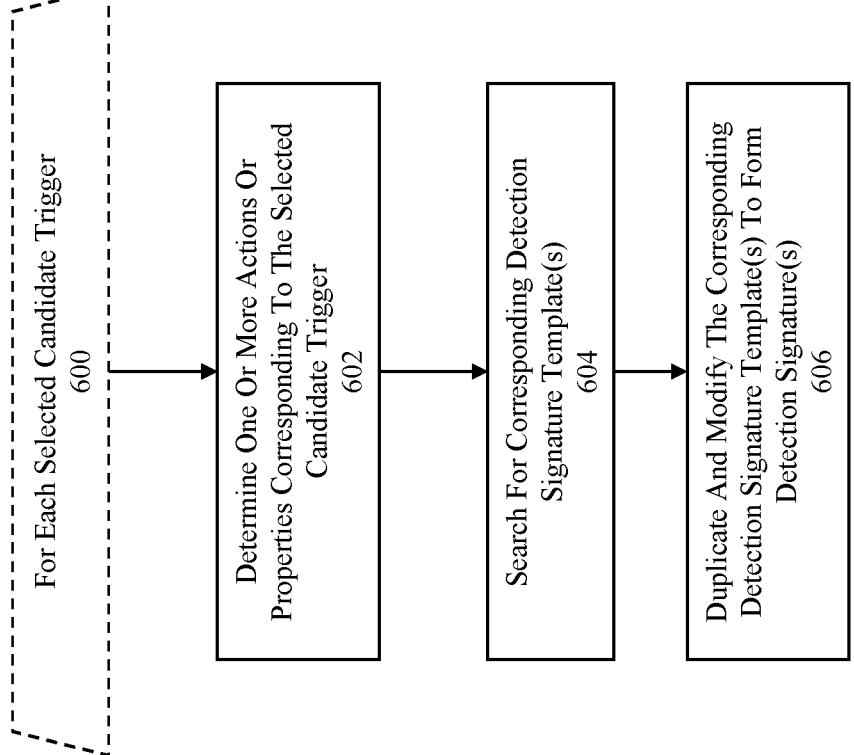
FIG. 6 illustrates an expanded view for monitoring the network using detection signatures according to some embodiments of the invention.

FIG. 6 illustrates an expanded view for monitoring the network using detection signatures according to some embodiments of the invention. The approach may be used to generate detection signatures that detect a single state-to-state transitions or to detect a group or sequence of state-to-state transitions. In some embodiments, detection events from one or more detection signatures may be aggregated to determine whether to trigger a responsive event (e.g., alert or automated action).

The process starts are 600, where for each candidate trigger a processing flow is initiated. In some embodiments, the candidate triggers are processed sequentially using a single processor. In some embodiments, multiple different processors can process different candidate triggers in parallel. This allows the processing burden to be distributed and the time to complete the signature generation process to be decreased.

At 602 a selected candidate trigger is processed by first determining one or more transitions or properties used to cause one or more state-to-state (STS) transitions in the selected candidate trigger (e.g., the STS transitions in the candidate trigger can be identified). For example, for each STS transition any of a protocol, feature, service, source, destination, property, transition is identified. In some embodiment, each transition may be associated to one or more detection signature templates.

At 604 the process searches the detection signature templates to identify one or more templates that correspond to the candidate trigger. Generally, a signature template is a cookie cutter security product signature where a number of fields are to be populated with information corresponding to the STS transition(s) represented by the candidate triggers. For example, a first field might comprise the transition, a source type (e.g., user, machine, or GPO) and possibly a source identifier, destination type (e.g., a user, group, or machine) and possibly a destination identifier. The template itself, once populated, represents a signature to be deployed in one or more security products. For example, a first template might correspond to a first way to detect the corresponding action or use of a property to cause a state change and a second template might correspond to a second way to detect the corresponding action or use of a property to cause a state change. For instance, if a candidate trigger is defined as user: "bob"->RDP->server: "Finance" at least three different detection signatures might be generated. A first detection signature that operates on network traffic—a detection signature that identifies an RDP (remote desktop protocol) communication for user "bob" where the destination server is "Finance". A second detection signature that operates on authentication log data that identifies the source as "Finance" and the user is "bob". A third detection signature that is implemented at an endpoint detection and response (EDR) agent where the user context is "bob" and a TCP flow to "finance" is identified. In some embodiments, the candidate trigger corresponds to a group or sequence of actions, where multiple templates may be combined in a single detection signature or where separate processing logic may be implemented to determine whether an action is necessary to address a one or a combination of detection events from a set of deployed detection signatures (see discussion of FIG. 7).

Once the corresponding detection signature or detection signatures are found, the process proceeds to 606, where the detection signatures are duplicated and populated with the corresponding information. For example, the source and target state information are input (e.g., this might comprise a source IP address and a destination IP address, a characteristic such as group membership or another identifier). In some embodiments, the detection signature template is also processed to include one or more conditions to be met to determine whether the detection signature should be triggered. In this way, detection signatures are generated that are ready to be deployed.

A discussion of example detection signatures and templates follows according to some embodiments. Generally, a detection signature template is written by one skilled in the art to detect a potentially relevant event indicative of the corresponding transition or property begin detected. Such detection signatures templates may be maintained in a library of detection signature templates (see e.g., signature creation templates 124) which may be further cataloged and classified.

In some embodiments, each detection signature template will include an identifier ("ID"), a specification of the corresponding property or transition being used, information that directly specifies or can be used to determine a type for the detection signature template, and a pattern to be matched. In some embodiments, the "ID" value is unique to each template and can be used to log triggering events (e.g., each log entry is identified by the "ID" and the corresponding pattern match). In some embodiments, an instance identifier (e.g., Instance_ID) is be provided either, in addition to the existing ID, appended to the detection signature template (e.g., more specifically to the existing ID EXISTING_ID-APPENDED_ID), or as a replacement ID (e.g., the Instance ID replaces the detection signature template ID). In some embodiments, the type of the detection signature template might be specified within the detection signature template (e.g., In a "Type" parameter), in a dataset associated with the detection signature template (e.g., in a relational database table entry that associates the detection signature template ID with a corresponding type identification), or determinable based on information within the detection signature template (e.g., based on a data source). In some embodiments, the type corresponds to a deployment location classification (e.g., on a network, at a source, at a destination or endpoint, at an authentication service).

As discussed herein, detection signature templates can be maintained for different transitions or properties. A non-exhaustive list of transitions/properties might comprise any of the following: "AddMember", "Admin", "AdminTo", "All", "CanRDP", "CanPSRemote", "Contains", "Delegate", "Execute", "ExecuteDCOM", "GetChanges", "GetChangesAll", "HasSession", "Link", "Member", "Owns", "RemoteControl", "ResetPassword", "SQLAdmin", or "Write". In some embodiments, detection signature templates might be divided into different types as discussed above based on at least the type of information they are used to process (e.g., network detection signatures, authentication detection signatures, source detection signatures, endpoint detection signatures). In some embodiments, a single transition or property might be associated with multiple different detection signature templates (e.g., detection signature templates of different types or detection signature templates that are of the same type but detect the transition or property in a different way). Using our example of account "bob" using RDP to access a target server, a detection signature instance might be generated from respective detection signature templates to detect the RDP activity in different ways. For instance, a first detection signature that operates on network traffic—a detection signature that identifies an RDP (remote desktop protocol) communication for user "bob" where the destination server is the "Target server". A second detection signature that operates on authentication log data that identifies the source as "Target server" and the user is "bob". A third detection signature that is implemented at an endpoint detection and response (EDR) agent where the user context is "bob" and a TCP flow to "Target server" is identified. A fourth detection signature that operates at the source using windows host eventing.

In some embodiments, a detection signature template includes a protocol field that specifies a corresponding protocol over which the access right or property can be utilized. Here, the protocols may include traditional communication protocols and other security or monitoring protocols. For example, the protocol might be any of a communication session detected from a packet on a network, a windows event, or any other any source or destination events that have a specified protocol for management (e.g., logging, notification, etc.).

In some embodiments, the detection signature template includes a pattern that provides a set of additional information that must be matched in order to cause the activation of the detection signature. For instance, the pattern might specify one or a set of protocols, one or more entities that utilize that protocol (e.g., a source or destination). In some embodiments, the pattern corresponds to specific entities (e.g., hosts or accounts) or information corresponding to those entities (e.g., IP address). In some embodiments, one or more entities might be represented by group membership or multiple entities (e.g., in a list or sequence). For example, a list or reference to a list (e.g., based on a group identifier) could be provided in a populated detection signature template and used to cause the output of a corresponding alert when corresponding preconditions are met (e.g., the type of transition or property is identified at a corresponding location). In some embodiments, a single detection signature template might include multiple different patterns, which when detected in combination or separately may be used to trigger a corresponding alert (e.g., host pattern, network pattern, authentication pattern, or EDR pattern).

For instance, a generic pattern might be defined as follows:

```
"ID": "NUMBER",
"Config": "TRANSITION/PROPERTY",
"TYPE1 Pattern": " "TYPE1_PATTERN_MATCHING_RULE(S)"
msg: "OUTPUT MESSAGE ON TYPE1 PATTERN MATCH",
"TYPE2 Pattern": " "TYPE2_PATTERN_MATCHING_RULE(S)"
msg: "OUTPUT MESSAGE ON TYPE2 PATTERN MATCH",
"TYPE3 Pattern": " "TYPE3_PATTERN_MATCHING_RULE(S)"
msg: "OUTPUT MESSAGE ON TYPE3 PATTERN MATCH",
"TYPE4 Pattern": " "TYPE4_PATTERN_MATCHING_RULE(S)"
msg: "OUTPUT MESSAGE ON TYPE4 PATTERN MATCH"
```

Here, the ID field contains a unique identifier for the detection signature template (e.g., "NUMBER" is replaced with a unique numerical value "1234"), "Config" specifies the transition or property being used (e.g., any of those provided herein or otherwise possible). The pattern statements each comprise a pattern to be matched and a corresponding message to be generated in the event of a pattern match. For instance, TYPE1_PATTERN_MATCHING_RULE(S) would be replaced with a pattern (e.g., embodied in a set of one or more rules) to be matched, and the OUTPUT MESSAGE ON TYPE1_PATTERN_MATCH would specify the corresponding message to be generated should that pattern be matched. Similarly, in some embodiments multiple patterns could be provided (see types 2, 3, and 4 patterns) within a single detection signature template whether of different types as illustrated here, or of the same type for detection in a different way. In some embodiments, the output message may comprise or be based on existing logging or tracking systems. For example, windows event logging and active directory logging may be used to automatically generate detection information which may be processed by filtering for the relevant information to determine if an alert should be generated at a later time.

Detection signature templates might be organized according to the following:

```
"ID": "1000",
"Config": "AdminTo",
"Protocol": ["RDP","WMI","WINRM","SCM"]"isession"
"Pattern": orig_hostname:$orig$ AND resp_hostname:$resphostname$
AND service:RDP
"ID": "2000",
"Config": "CanRDP",
"Protocol": "RDP"
"Pattern": orig_hostname:$orig$ AND resp_hostname:$resphostname$
"ID": "3000",
"Config": "ExecuteDCOM",
"Protocol": "DCERPC"
"Pattern": orig_hostname:$orig$ AND resp_hostname:$resphostname$
AND operation:RemoteActivation
```

-continued

```
"ID": "4000",
"Config": ["GetChanges","GetChangesAll"],
"Protocol": "Kerberos",
"Pattern": orig_hostname:$orig$ AND
service:*E3514235-4B06-11D1-AB04-00C04FC2DCD2\/*domain$
"ID": "5000",
"Config": "All",
"Protocol": "Kerberos",
"Pattern": client:$account$\/* AND service:*domain$ AND
request_type:TGS
```

Where WMI is windows management instrumentation, WINRM is windows remote management, SCM is service control manager, and DCERPC is distributed computing environment remote procedure call. Here, a value ending in the symbol "$" is replaced with the thing or membership to be detected by the pattern. For instance, an origination host ("orig_hostname"), a response host ("resp_hostname"), an account ("client"), or domain ("service"). In some embodiments, multiple protocols may be listed where any one of which may satisfy the corresponding field.

For instance, a particular detection signature template might be defined as follows:

```
"ID": "0003",
"Config": "ExecuteDCOM",
"Host Pattern": "Event | where Source == \"Microsoft-Windows-
DistributedCOM\" | where UserName in (\"$Assigned_Variable_1$\") |
where EventData contains \"$Assigned_Variable_2$\" |
(msg: \"DCOM\" src=UserName, dst=Destination Host")"
```

Here, the ID field contains a unique identifier for the detection signature template ("0003"), "Config" specifies the transition or property being used ("ExecuteDCOM"). pattern is a "Host Pattern" which is to be populated with the relevant information (e.g., Assigned_Variable_1 and Assigned_Variable_2). If the patterns is matched a detection signature message is generated that indicates a DCOM event and the source username and destination host. Values within "$" symbols are dynamically generated by populating the corresponding value based on the selected candidate trigger being implemented as a detection signature instance.

A second detection signature template is provided below for detection of an SQLAdmin event.

```
"ID": "0004",
"Config": "SQLAdmin",
"Network Pattern": "alert tcp \"$Assigned_Variable$\" any -> any 88
(msg:\"SQLAdmin\"; flow:established,to_server; content:\"MSSQLSvc\";
content:\"$Assigned_Variable $\";)"
```

Additional examples are provided below where both a host and a network pattern are provided. Here both patterns share the same message. Thus, if either pattern is matched, a corresponding message is generated.

```
"ID": "0001",
"Config": "CanPSRemote",
"Host Pattern": "SecurityEvent | where EventID == \"4624\" | where
LogonType==\"10\" | where Account == \"$Assigned_Variable_1$\" |
where Computer == \"$Assigned_Variable_2$\"",
"Network Pattern": "alert tcp \"$Assigned_Variable_3$\" any ->
\"$Assigned_Variable_4$\" [5986,5985,1270]"
(msg: \"CanPSRemote\"; flow:established,to_server; content:\"POST
/wsman\"; depth:11; fast_pattern; content:\"Content-Type|3a
```

-continued

```
20|application/soap+xml\"; distance:0; content:!\"Authorization|3a 20|\";)"
"ID": "0002",
"Config": "CanRDP",
"Host Pattern": "Event | where EventID == \"1024\" | where
UserName == \"$Assigned_Variable_1$\" and EventData contains
\"$Assigned_Variable_2$\"",
"Network Pattern": "alert tcp \"$Assigned_Variable_3$\" any ->
\"$Assigned_Variable_4$\" 3389 (msg:\"CanRDP\"; flow:
to_server,established; content:\"|03|\"; offset: 0; depth: 1; content:\"|E0|\";
offset: 5; depth: 1;)"
```

In some embodiments, a pattern corresponds to a windows event which is associated with a logging apparatus. For example, a windows event (see "ID" 0001 "Host Pattern" corresponding to windows EventID 4624) might be associate with a logging action of the occurrence of the event and potentially a transmission of that log or a corresponding log entry to a processing element that leverages existing logging processes built into windows. In another example, a message format can be provided for use by a relevant detection apparatus (e.g., the Snort intrusion detection system). Additionally, as illustrated, 5986, 5985, 1270, and 3389 all indicate TCP ports that are to be matched for the relevant pattern. Similarly, in detection signature templates 0001 and 0002, "any" indicates that the source may use any port to transit the relevant information (e.g., using TCP).

Some example STS transition detection signatures are provided below. First, for the STS transition Bob->CanPS-REMOTE->ServerA, might comprise the following which includes a corresponding host and network pattern identified by "SecurityEvent" and "alert" respectively:

```
Security Event | where EventID == "4624" | where LogonType=="10" |
where Account == "Bob" | where Computer == "ServerA"
OR
alert tcp Bob_Machine" any -> ServerA [5986,5985,1270]
(msg: "CanPSRemote"; flow:established,to_server; content:"POST
/wsman"; depth:11; fast_pattern; content:"Content-Type|3a
20|application/soap+xml"; distance:0; content:!"Authorization|3a 20|";)
```

Second, for the STS transition or Joe->ExecuteDCOM->ServerB, might comprise the following:

```
Event | where Source == "Microsoft-Windows-DistributedCOM" | where
UserName in ("Joe") | where EventData contains "ServerB"
(msg: "DCOM" src=Joe, dst=ServerB")
```

Third, for the STS transition or ServerC->SQLAdmin->ServerD, might comprise the following:

```
alert tcp ServerC any -> ServerD 88
(msg:"SQLAdmin"; flow:established,to_server; content:"MSSQLSvc";
content:"ServerD";)"
```

As can be understood from the description and illustrations provided herein, other detection signature templates and detection signature instances may be generated using the disclosed techniques.

Figure 7:
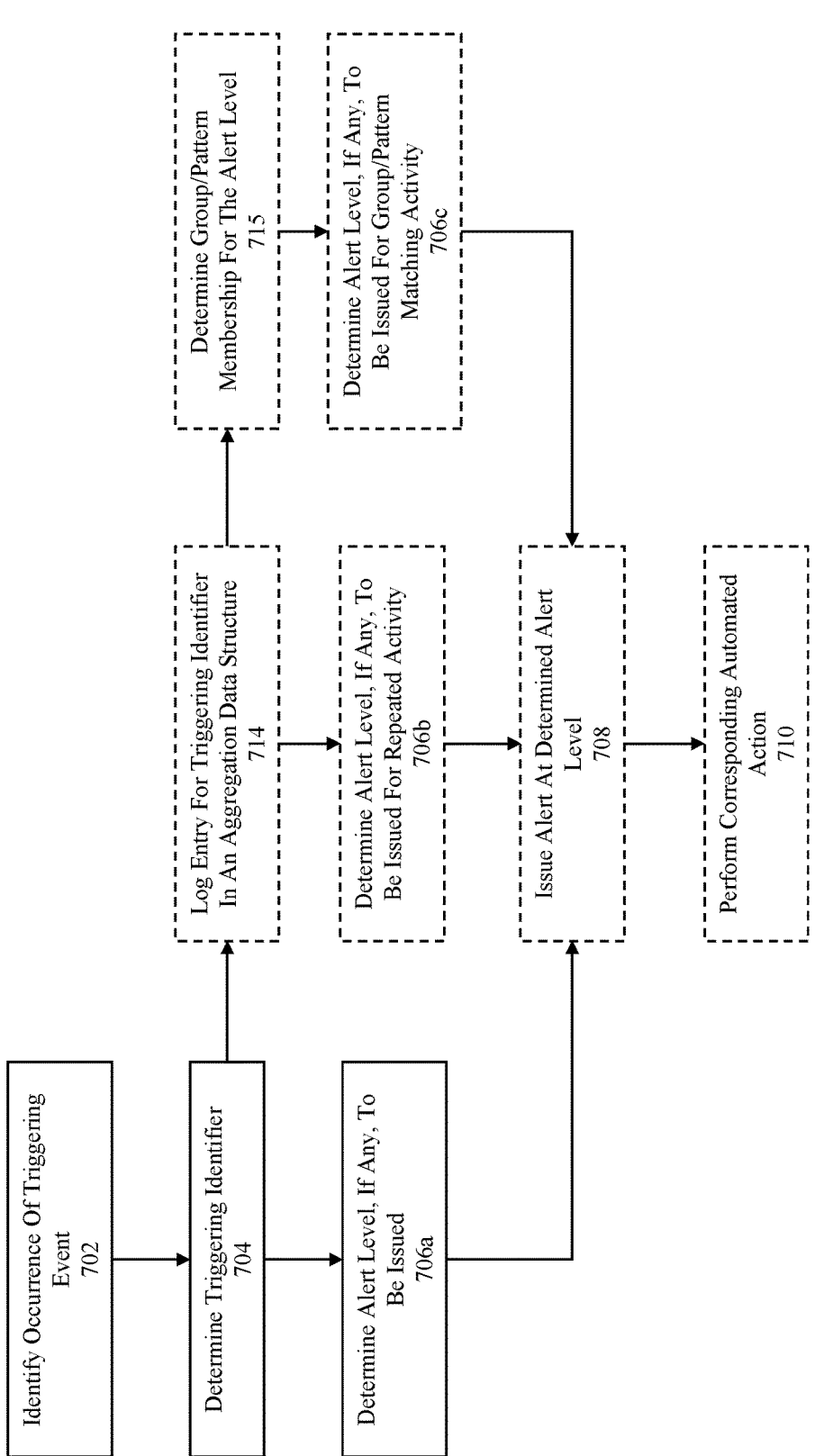
FIG. 7 illustrates an expanded view for processing activated detection signatures according to some embodiments of the invention.

FIG. 7 illustrates an expanded view for processing activated detection signatures using the software representation according to some embodiments of the invention. The approach illustrated herein is only one approach that may be possible.

The process starts at 702 where a triggering event is detected (e.g., an event generated when a detection signature identifies information matching the detection signature). For example, a network packet is processed and determined to match a detection signature, which causes the generation of a notification that the detection signature was triggered. In response, a triggering identifier is determined at 704. For example, the triggering identifier might be determined based on an identifier passed from the detection signature template to the detection signature instance, and passed to the process at 702 via a triggering event. In some embodiments, the detection signature instance includes an instance identifier (which may comprise a concatenation of the identifier from the template and an additional template) which can be used to determine the specific conditions met. In some embodiments, the specific conditions that satisfied the detection signature are provided as part of the triggering event.

At 714, a log entry is generated for the triggering identifier in an aggregation data structure. For example, a log might be organized as a set of sequential data where each entry is placed at the beginning or end of the log to maintain a sequencing relationship between log entries. In some embodiments, the log entries might comprise a tabular representation for a corresponding time period. Each log entry identifies the detection signature corresponding to each triggering event, any relevant values, and a time of occurrence.

At 715, a determination is made as to whether the triggering identifier is a member of a group or pattern of triggering occurrences. For instance, a sequence of state-to-state transitions might be captured using multiple detection signatures that individually detect one state-to-state transition of a sequence of state-to-state transitions. In some embodiments, the group or pattern membership might correspond to multiple patterns in a group—e.g., where a first pattern proceeds a second pattern or where the first and second patterns are both indicative of a risk of compromise to the same resource.

At 706a-c the corresponding alert levels are determined. In some instances, no alert is generated (e.g., only the logging activity is performed). In other embodiments, one or more alerts are generated. For instance, at 706a the alert level is determined solely based on the single triggering event without consideration of aggregated events or repeated occurrences of the same or related occurrences. At 706b, the alert level is determined based on repeated activity represented by the same triggering event. For instance, three occurrences of the same activity may correspond to consistent bad behavior and thus a corresponding alert might be generated based on the number of the occurrences. At 706c, the alert level is determined based on group or pattern activity. For example, a pattern may be detected or partially detected corresponding to the triggering event e.g., the triggering event comprises a subset of a pattern or is part of a group. As illustrated here (e.g., based on a sequence of detection signature instance identifiers), each alert level is determined independently.

However, at 708 Any alerts that are determined at 706a-c are processed to determine which if any should be issued (e.g., at the determined level). In some embodiments, all alerts are issued. In some embodiments, only the highest-level alert is generated (e.g., an alert generated based on a repeated activity has a higher level than an alert generated based on a singular action, and an alert generated based on group membership or a pattern of activity has the highest alert level). In some embodiments the alerts may be combined into a single alert to be provided together. The alerts may be transmitted using any combination of email, text message, recorded audio message, or prompt on a user interface. At 710 any automated actions are performed. For instance, password resets, shutdown, or lock out of accounts or resources.

Figure 8:
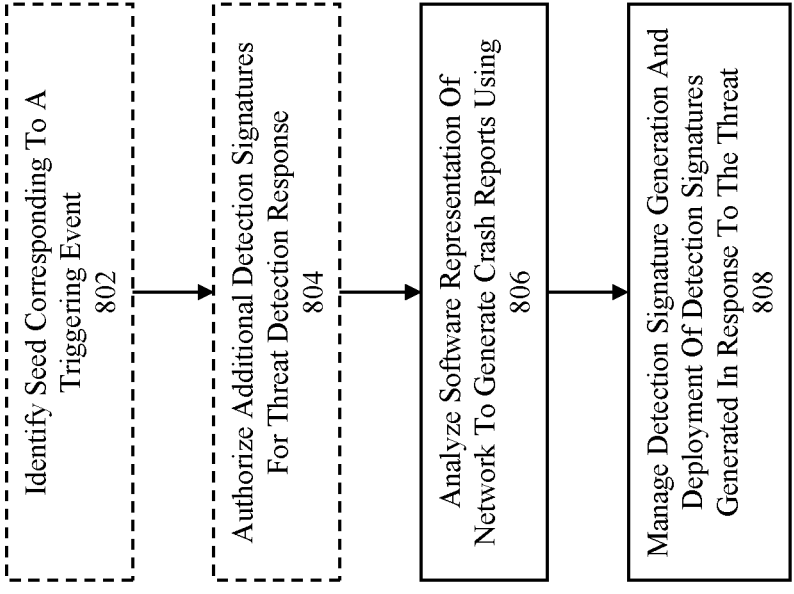
FIG. 8 illustrates an expanded view for analyzing the software representation to create event responsive detection signatures according to some embodiments of the invention.

FIG. 8 illustrates an expanded view for analyzing software representation to create event responsive detection signatures according to some embodiments of the invention.

At 802 a seed corresponding to a triggering event is identified. In some embodiments this may be combined with or comprise the determination of the triggering identifier at 704. That seed then might be associated with authorization of additional detection signatures for threat detection response at 804. For instance, a number of additional detection signatures responsive to the triggering event are authorized for generation (e.g., 100). In some embodiments, an entry point or a set of global parameter values are identified for use in place of a seed.

At 806, the software representation is analyzed to generate crash reports that correspond to attack paths from a state identified by a seed using any of the approaches illustrated herein. For example, the seed might be used as an input to the fuzzer process to initiate additional exploration of the configuration as represented by the software. Alternatively or additionally, any protected entities reachable after the seed can be identified and additional candidate signatures for those resources can be generated at 806. Finally, at 808, the generation and deployment of threat responsive detection signatures generated based on candidate triggers that were identified in 806 is managed using any of the techniques disclosed herein.

Figure 9:
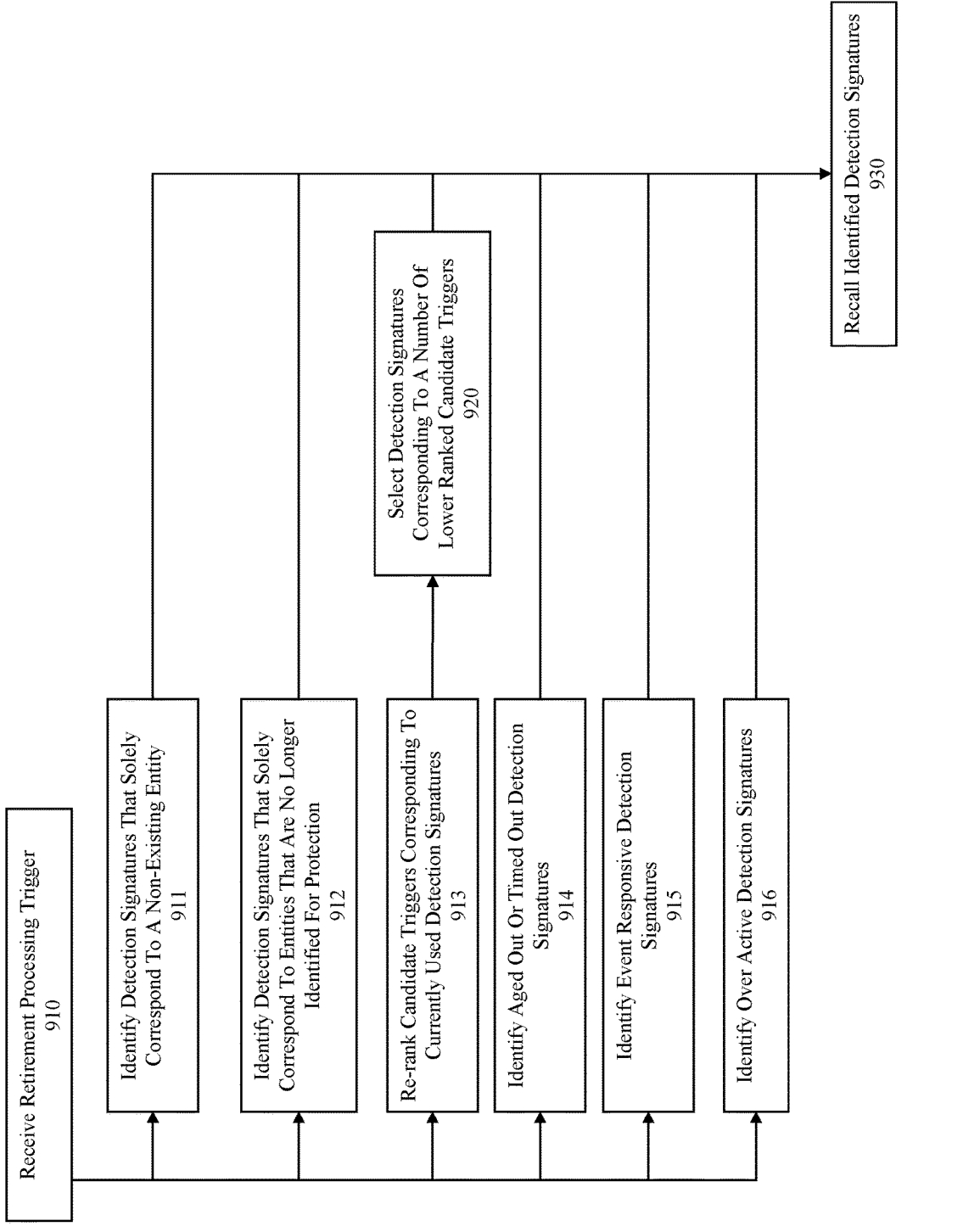
FIG. 9 illustrates an expanded view for monitoring detection triggers for retirement according to some embodiments of the invention.

FIG. 9 illustrates an expanded view for monitoring triggers for retirement according to some embodiments of the invention. Computer networks are highly dynamic environments and as a result security tools should be capable of adjusting to changing conditions, which as described herein may include retirement of detection signatures for various reasons. Generally, the approach disclosed herein creates detection signatures that represent possible actions on a network or sequences thereof. These actions while are possible due to the various policies parameters of the computing network. These actions may be leveraged by an attacker to gain access to one or more protected entities (e.g., computing resources or services on a network). As a result, indiscriminate creation of detection signatures will likely generate noise that will make it difficult to identify malicious activity. FIG. 9 provides various tools to manage detection signatures and to minimize noise in event reporting.

The process starts at 910 when a retirement processing trigger is received. This trigger might be generated in response to an identification of a change in the configuration of the network, a periodic signal, a timer, a minimum or maximum threshold number of triggering events, an occurrence of an event of identified for responsive processing, or any combination thereof. In response to receiving a retirement processing trigger, any of 911-916 may be initiated.

For example, at 911 a process is executed that determines whether any detection signature solely corresponds to a non-existing entity or triggers (e.g., no relevant resource is currently associated with the detection signature). This might be determined by processing the detection signature to verify that the detection signature corresponds to a matching STS Transition as represented by the crash reports or candidate triggers. In some embodiments, the matching STS transition is identified by processing the software representation in a source code format (e.g., to determine whether all references to a corresponding function call have been removed or commented out) or as an executable (e.g., but determining whether the STS transition can be triggered using one or more inputs). In some embodiments, a mapping structure is maintained that maps each detection signature to one or more corresponding crash reports which can be used to traverse the software representation to determine whether the corresponding functions and transitions still exist. Similarly, at 912 the same techniques can be used to identify detection signatures that no longer correspond to an entity that is identified for protection.

In some embodiments, a detection signature might age out or time out at 914. For example, a detection signature might be generated having a specified age limit. Once that age limit is reached (e.g., based on a corresponding expiration of a time period), that detection signature is automatically removed. In some embodiments, a detection signature might time out. As used here, time out occurs when a detection signature is not triggered within a given time period (e.g., as determined using a duration and by processing a log to determine whether that signature has been triggered within the given time frame).

At 915, detection signatures that corresponding to an apparently no longer active intrusion even may be identified. For example, event responsive detection signatures can be identified using a list, a plurality of database entries, or within each respective detection signature. Such signatures can be identified for removed by a user or based on one or more rules corresponding to the event responsive detection signatures. For instance, one rule might specify that if no event responsive detection signature or a particular event responsive detection signature is triggered within a given time frame, one or all of those detection signatures might be identified for recall.

At 916, signatures that are overly active are identified (e.g., signatures that are frequently triggered by presumably non-malicious behavior). It is likely that much of the traffic in a computer network corresponds to activities that have a low likelihood of being malicious. For example, most employees will regularly access company email systems, and internal communication tools (e.g., Slack). As a result, detection signatures that are frequently triggered may have little value. Such triggers may be identified for recall to conserve processing resources associated with the detection signatures. Additionally, a user might also manage the detection signatures to remove or whitelist activities that are so common as to be essentially meaningless. Such white lists may be propagated back to the candidate trigger selection processes to avoid reintroduction of corresponding signatures. Additionally, another approach to avoid deploying overly active detection signatures is to specify increasingly larger minimum sequence lengths for use in the candidate trigger selection process.

At 913, the candidate triggers corresponding to currently used detection signatures are identified and re-ranked to allow for selection of detection signatures corresponding to a number of lower ranked candidate triggers at 920. Finally, at 930, any detection signatures identified for retirement are processed and recalls are issued for those signatures.

System Architecture Overview

Figure 10:
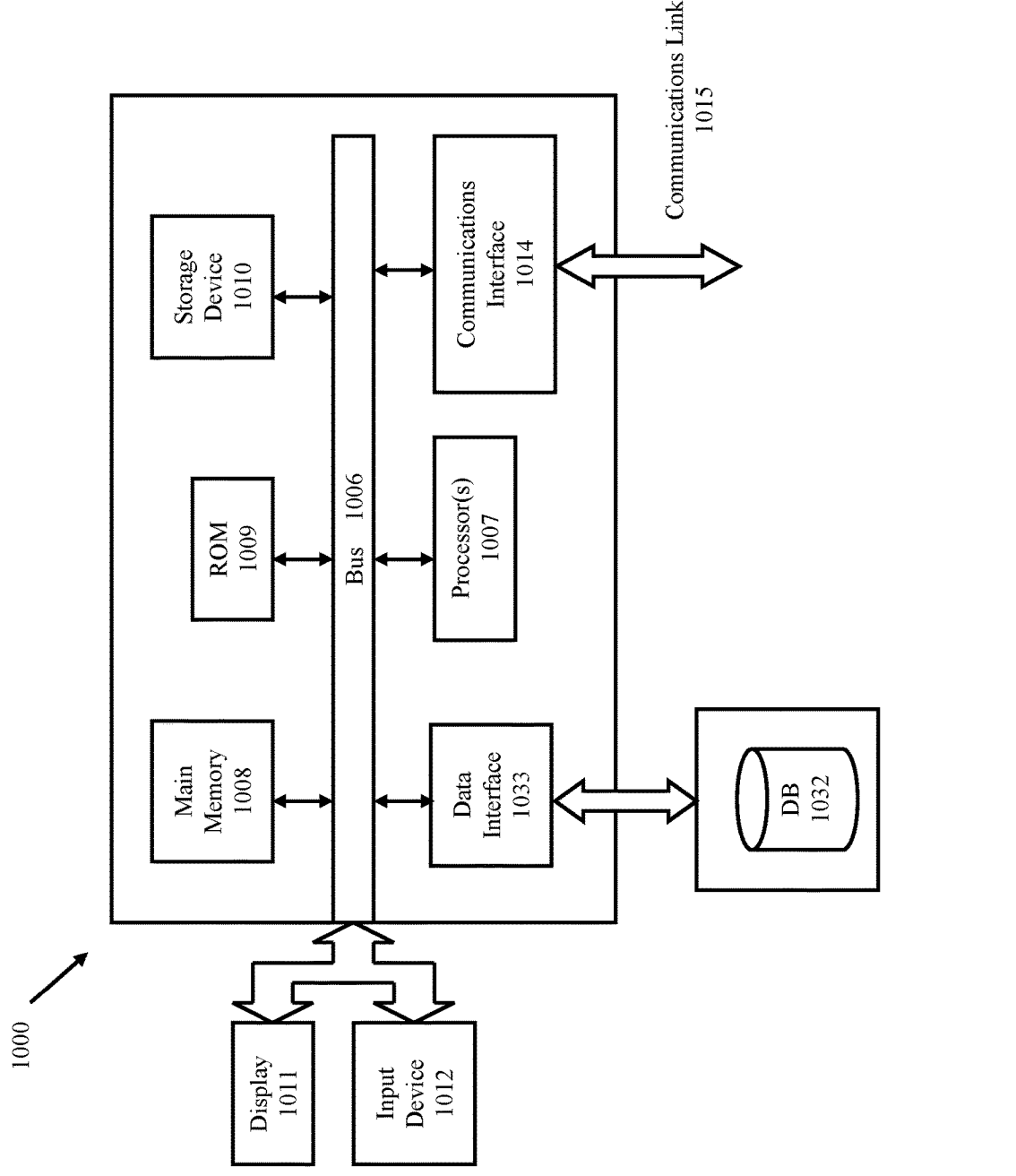
FIG. 10 is a block diagram of an illustrative computing system suitable for implementing some embodiments of the present invention.

FIG. 10 is a block diagram of an illustrative computing system 1000 suitable for implementing an embodiment of the present invention. Computer system 1000 includes a bus 1006 or other communication mechanism for communicating information, which interconnects subsystems and devices, such as processor 1007, system memory 1008 (e.g., RAM), static storage device 1009 (e.g., ROM), disk drive 1010 (e.g., magnetic or optical), communication interface 1014 (e.g., modem or Ethernet card), display 1011 (e.g., CRT or LCD), input device 1012 (e.g., keyboard), and cursor control.

According to one embodiment of the invention, computer system 1000 performs specific operations by processor 1007 executing one or more sequences of one or more instructions contained in system memory 1008. Such instructions may be read into system memory 1008 from another computer readable/usable medium, such as static storage device 1009 or disk drive 1010. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1007 for execution. Such a medium may take many forms, including but not limited to, non-volatile media and volatile media. Non-volatile media includes, for example, optical or magnetic disks, such as disk drive 1010. Volatile media includes dynamic memory, such as system memory 1008.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1000. According to other embodiments of the invention, two or more computer systems 1000 coupled by communication link 1015 (e.g., LAN, PTSN, or wireless network) may perform the sequence of instructions required to practice the invention in coordination with one another.

Computer system 1000 may transmit and receive messages, data, and instructions, including program, e.g., application code, through communication link 1015 and communication interface 1014. Received program code may be executed by processor 1007 as it is received, and/or stored in disk drive 1010, or other non-volatile storage for later execution. Computer system 1000 may communicate through a data interface 1033 to a database 1032 on an external storage device 1031.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

In some embodiments, the approaches illustrated herein may be extended to solving other issues. In particular, if an issue can be turned into a sequence of actions or properties that can be used traverse a set of interrelated states (event if a particular state is only reachable when a condition is satisfied) to reach a designated state then that issue may be solvable using the disclosed techniques. In some embodiments, different inputs can be used to analyze the software representation.

What is claimed is:

1. A method comprising:

identifying network configuration data and network policy data for a computer network;

generating a software representation of the computer network based on the network configuration data and network policy data by:

receiving the network configuration data and the network policy data;

identifying a plurality of relationships between objects or entities represented in the network configuration data or the network policy data; and generating a plurality of functions based on the plurality of relationships, wherein at least some of the plurality of functions include one or more function calls selectable based on an input, at least one of the entities is identified for protection and associated with a crash statement, and the software representation is configured to be stimulated with inputs to identify a sequence of state-to-state transitions that cause execution of the crash statement.

2. The method of claim 1, wherein the network configuration data specifies access rights allocated to respective groups and the network policy data specifies a set of access rights for group members to access network resources.

3. The method of claim 1, wherein the software representation comprises a source code representation or an executable compiled from the source code representation and represents a plurality of states and transitions between states.

4. The method of claim 1, wherein the software representation comprises a source code representation or an executable compiled from the source code representation and encapsulates a bitmap representing a plurality of states and transitions between states.

5. The method of claim 1, wherein the objects comprise one or more entities and the entities comprise any of the following: computing devices, users, domains, group policy objects (GPOs), key vaults, subscriptions, tenants, resource groups, applications, virtual machines (VMs), groups, or organizational units (OUs).

6. The method of claim 1, wherein the plurality of relationships comprise access rights or properties that a respective entity can use to interact with another entity.

7. The method of claim 1, wherein the plurality of relationships are represented by respective state-transition-state tuples.

8. The method of claim 7, wherein a state-transition-state tuple represents a relationship of the plurality relationships and corresponds to a condition, and a function of the plurality of functions includes the condition as a prerequisite to executing a corresponding function call.

9. A non-transitory computer readable medium having stored thereon a set of instructions, the set of instructions, when executed by a processor, causing a set of acts comprising:

identifying network configuration data and network policy data for a computer network;

generating a software representation of the computer network based on the network configuration data and network policy data by:

receiving the network configuration data and the network policy data;

identifying a plurality of relationships between objects or entities represented in the network configuration data or the network policy data; and generating a plurality of functions based on the plurality of relationships, wherein at least some of the plurality of functions include one or more function calls selectable based on an input, at least one of the entities is identified for protection and associated with a crash statement, and the software representation is configured to be stimulated with inputs to identify a sequence of state-to-state transitions that cause execution of the crash statement.

10. The computer readable medium of claim 9, wherein the network configuration data specifies access rights allocated to respective groups and the network policy data specifies a set of access rights for group members to access network resources.

11. The computer readable medium of claim 9, wherein the software representation comprises a source code representation or an executable compiled from the source code representation and represents a plurality of states and transitions between states.

12. The computer readable medium of claim 9, wherein the software representation comprises a source code representation or an executable compiled from the source code representation and encapsulates a bitmap representing a plurality of states and transitions between states.

13. The computer readable medium of claim 9, wherein the objects comprise one or more entities and the entities comprise any of the following: computing devices, users, domains, group policy objects (GPOs), key vaults, subscriptions, tenants, resource groups, applications, virtual machines (VMs), groups, or organizational units (OUs).

14. The computer readable medium of claim 9, wherein the plurality of relationships comprise access rights or properties that a respective entity can use to interact with another entity.

15. The computer readable medium of claim 9, wherein the plurality of relationships are represented by respective state-transition-state tuples.

16. The computer readable medium of claim 15, wherein a state-transition-state tuple represents a relationship of the plurality relationships and corresponds to a condition, and a function of the plurality of functions includes the condition as a prerequisite to executing a corresponding function call.

17. A computing system comprising:
a memory storing a set of instructions; and
a processor to execute the set of instructions to perform a set of acts comprising:
identifying network configuration data and network policy data for a computer network;

generating a software representation of the computer network based on the network configuration data and network policy data by:
receiving the network configuration data and the network policy data;
identifying a plurality of relationships between objects or entities represented in the network configuration data or the network policy data; and
generating a plurality of functions based on the plurality of relationships, wherein at least some of the plurality of functions include one or more function calls selectable based on an input, at least one of the entities is identified for protection and associated with a crash statement, and the software representation is configured to be stimulated with inputs to identify a sequence of state-to-state transitions that cause execution of the crash statement.

18. The computing system of claim 17, wherein the network configuration data specifies access rights allocated to respective groups and the network policy data specifies a set of access rights for group members to access network resources.

19. The computing system of claim 17, wherein the software representation comprises a source code representation or an executable compiled from the source code representation and represents a plurality of states and transitions between states.

20. The computing system of claim 17, wherein the software representation comprises a source code representation or an executable compiled from the source code representation and encapsulates a bitmap representing a plurality of states and transitions between states.

21. The computing system of claim 17, wherein the objects comprise one or more entities and the entities comprise any of the following: computing devices, users, domains, group policy objects (GPOs), key vaults, subscriptions, tenants, resource groups, applications, virtual machines (VMs), groups, or organizational units (OUs).

22. The computing system of claim 17, wherein the plurality of relationships comprise access rights or properties that a respective entity can use to interact with another entity.

23. The computing system of claim 17, wherein the plurality of relationships are represented by respective state-transition-state tuples.

24. The computing system of claim 23, wherein a state-transition-state tuple represents a relationship of the plurality relationships and corresponds to a condition, and a function of the plurality of functions includes the condition as a prerequisite to executing a corresponding function call.

* * * * *